US008150897B2

(12) United States Patent
Shoji et al.

(10) Patent No.: US 8,150,897 B2
(45) Date of Patent: *Apr. 3, 2012

(54) COMPUTER FILE SYSTEM DRIVER CONTROL METHOD, PROGRAM THEREOF, AND PROGRAM RECORDING MEDIUM

(75) Inventors: Koichiro Shoji, Zama (JP); Takashi Nozaki, Zama (JP)

(73) Assignee: Science Park Corporation, Zama-shi (JP)

( * ) Notice: Subject to any disclaimer, the term of this patent is extended or adjusted under 35 U.S.C. 154(b) by 274 days.

This patent is subject to a terminal disclaimer.

(21) Appl. No.: 12/500,056

(22) Filed: Jul. 9, 2009

(65) Prior Publication Data

US 2010/0030782 A1 Feb. 4, 2010

Related U.S. Application Data

(62) Division of application No. 10/505,751, filed on Aug. 26, 2004, now Pat. No. 7,624,135.

(30) Foreign Application Priority Data

Feb. 27, 2002 (JP) .................................. 2002-50778

(51) Int. Cl.
*G06F 17/30* (2006.01)

(52) U.S. Cl. ....................... 707/823; 707/781; 713/165

(58) Field of Classification Search .................. 707/823, 707/781; 713/165
See application file for complete search history.

(56) References Cited

U.S. PATENT DOCUMENTS

| 5,832,510 | A | * | 11/1998 | Ito et al. ......................... 711/100 |
| 6,011,544 | A | * | 1/2000 | Sato .............................. 345/168 |
| 2002/0103781 | A1 | * | 8/2002 | Mori et al. ....................... 707/1 |
| 2002/0188854 | A1 | * | 12/2002 | Heaven et al. ................ 713/186 |
| 2003/0009685 | A1 | * | 1/2003 | Choo et al. ..................... 713/200 |

FOREIGN PATENT DOCUMENTS

| EP | 1154404 | 11/2001 |
| JP | 6187213 A | 7/1994 |
| JP | 2001175524 | 6/2001 |

(Continued)

OTHER PUBLICATIONS

H. R. Kendall et al.; User-Level Extensibility in the MonA File System:, Department of Computer Science and Engineering, University of Notre Dame, 1998. Cited in the PCT search report.

(Continued)

*Primary Examiner* — John E Breene
*Assistant Examiner* — Dennis Myint
(74) *Attorney, Agent, or Firm* — Westerman, Hattori, Daniels & Adrian, LLP

(57) ABSTRACT

In the method of controlling a file system driver of an electronic computer and the program for the method and further the storage medium containing the program according to the present invention, access to a file stored in a storage device of the electronic computer is controlled in a kernel mode. When a specific file in a file system of an electronic computer (11) is accessed from an application program (4), the access is received in a kernel mode (8) of an OS (3). Then, an access control database (36) comprising filenames in the file system and access methods is referenced to judge whether or not the access to the specific file conforms to conditions prescribed in the access control database (36). If the access to the specific file does not conform to the conditions, the access is canceled.

20 Claims, 24 Drawing Sheets

FOREIGN PATENT DOCUMENTS

WO   0145084 A1   6/2001

OTHER PUBLICATIONS

Brian N. Bershad et al.; "Watchdogs—Extending the UNIX File System", Computing Systems, vol. 1, No. 2, pp. 169-188, 1988. Cited in the PCT search report.

A. S. Tanenbaum, Modern Operating Systems, pp. 203-229, Nov. 30, 1995. Cited in the PCT search report.

Kazumasa Omote et al.; "User Identification Schemes Using Biometrics of Keystroke" Japan Advanced Institute of Science and Technology, vol. 98, No. 12, pp. 213-218. Cited in the PCT Search Report.

International Search Report dated Jun. 17, 2003 in Corresponding International Application No. PCT/JP03/02209.

* cited by examiner

Example of File Attribute Database 37

| Filename | Creation Date | Updating Date | Access Date | Hidden File | Read-only | Size | Access Authorized User |
|---|---|---|---|---|---|---|---|
| C:¥folder1¥filename01.abc | 020104 15:10 | 020104 15:15 | 0202101 10:01 | no | no | 185,000 | open |
| C:¥folder1¥filename02 | **** : | ** : | ** : | no | no | *,*** | owner |
| C:¥folder1¥filename03.bcd | **** : | ** : | ** : | no | yes | *,*** | Administrator |
| C:¥folder1¥filename04 | **** : | ** : | ** : | no | yes | *,*** | Taro/pswd |

Fig. 6

Example 1 of Control Condition Database 36

| Filename | Create | Open | Close | Read | Write |
|---|---|---|---|---|---|
| C:¥folder1¥filename01.abc | 5 | 20 | 20 | 14 | 4 |
| C:¥folder1¥filename02.abc | 0 | 20 | 20 | 14 | 0 |
| ¥***¥**:* | 5 | 20 | 20 | 14 | 0 |
| ¥***¥**:* | 1 | 20 | 20 | 14 | 1 |
| ¥***¥**:* | 0 | 1 | 1 | 1 | 0 |

Fig. 7A

Example 2 of Control Condition Database

| User | Filename | Create | Open | Close | Read | Write | Period | Time zone |
|---|---|---|---|---|---|---|---|---|
| Taro | C:¥folder1¥filename01 | 5 | 20 | 20 | 14 | 10 | 2002/02/01:2002/04/30 | 0930:1730 |
| Taro | C:¥folder1¥filename02 | 0 | 20 | 20 | 14 | 0 | 2002/02/01:2002/04/30 | 0930:1730 |
| Hanako | C:¥folder1¥filename01 | 5 | 20 | 20 | 14 | 0 | 2002/02/01:2002/04/30 | 1400:1700 |
| Hanako | C:¥folder1¥filename02 | 1 | 20 | 20 | 14 | 1 | 2002/02/01:2002/04/30 | 1400:1700 |
| Everyone | C:¥folder1¥filename01 | 0 | 1 | 1 | 1 | 0 | 2002/02/01:2002/04/30 | 0800:2200 |

Example of Access Log Database 38

| User | Filename | Cerate | Open | Close | Read | write | Time code |
|---|---|---|---|---|---|---|---|
| Taro | C:¥folder1¥filename01.abc | 1 | 0 | 0 | 0 | 0 | 2001/12/10 18:06:00 |
| Taro | C:¥folder1¥filename01.abc | 0 | 1 | 0 | 0 | 0 | 2002/01/05 01:06:30 |

Fig.20

Example of Format of Input Data

| 210 | 211 | 212 | 213 | 214 |
|---|---|---|---|---|
| Number | Time | IP | Key code | Depress/Release |
| 0 | 1383274448 | 192.168.1.245 | 35 | 0 |
| 1 | 1384275888 | 192.168.1.245 | 23 | 0 |
| 2 | 1384676464 | 192.168.1.245 | 35 | 1 |
| 3 | 1385077040 | 192.168.1.245 | 19 | 0 |
| 4 | 1385377472 | 192.168.1.245 | 23 | 1 |
| 5 | 1385878192 | 192.168.1.245 | 30 | 0 |
| 6 | 1387180064 | 192.168.1.245 | 19 | 1 |
| 7 | 1387180064 | 192.168.1.245 | 30 | 1 |

Fig. 23

| | | Identification Results | | | | | | |
|---|---|---|---|---|---|---|---|---|
| | | A | B | C | D | E | F | G |
| Read files | A | 75% | 6% | 0% | 0% | 13% | 6% | 0% |
| | B | 0% | 100% | 0% | 0% | 0% | 0% | 0% |
| | C | 0% | 24% | 71% | 0% | 0% | 6% | 0% |
| | D | 7% | 0% | 7% | 79% | 7% | 0% | 0% |
| | E | 22% | 0% | 11% | 17% | 50% | 0% | 0% |
| | F | 0% | 8% | 15% | 0% | 0% | 77% | 0% |
| | G | 13% | 13% | 0% | 0% | 7% | 0% | 67% |

Example of Control Database

| Client | User | Filename | Create | Open | Close | Read | Write | Period | Time zone |
|---|---|---|---|---|---|---|---|---|---|
| 192.168.1.245 | Taro | C:\folder1\filename01 | 5 | 20 | 20 | 14 | 10 | 2002/02/01:2002/04/30 | 0930:1730 |
| 192.168.1.245 | Taro | C:\folder1\filename02 | 0 | 20 | 20 | 14 | 0 | 2002/02/01:2002/04/30 | 0930:1730 |
| 192.168.1.245 | Hanako | C:\folder1\filename01 | 5 | 20 | 20 | 14 | 0 | 2002/02/01:2002/04/30 | 1400:1700 |
| 192.168.1.245 | Hanako | C:\folder1\filename02 | 1 | 20 | 20 | 14 | 1 | 2002/02/01:2002/04/30 | 1400:1700 |
| 192.168.1.245 | Everyone | C:\folder1\filename01 | 0 | 1 | 1 | 1 | 0 | 2002/02/01:2002/04/30 | 0800:2200 |

Fig. 24

COMPUTER FILE SYSTEM DRIVER CONTROL METHOD, PROGRAM THEREOF, AND PROGRAM RECORDING MEDIUM

This application is a division of U.S. patent application Ser. No. 10/505,751 filed on Aug. 26, 2004 which is hereby incorporated by reference in its entirety.

TECHNICAL FIELD

The present invention relates to a method of controlling access to a file stored in a storage medium of an electronic computer, and also relates to a program for the method and a storage medium containing the program. More particularly, the present invention relates to a method of controlling the processing of an access to a file stored in a storage device, e.g. a hard disk, of an electronic computer, and also relates to a program for the method and a computer readable medium containing the program.

BACKGROUND ART

There are various kinds of file systems used in electronic computers. A file system is controlled and managed by a file system driver of an OS (Operating System) used in an electronic computer. Files downloaded from Internet and so forth are used after being stored in an auxiliary storage device, e.g. a hard disk, of the electronic computer. The stored files are hardly deleted except as consciously deleted by the user.

(Configuration of Electronic Computer)

An electronic computer comprises many hardware resources such as a central processing unit (CPU), storage devices (a memory, a hard disk, etc.), input devices (a keyboard, a mouse, etc.), output devices (a display, etc.), and peripheral devices (a printer, a scanner, etc.) that are connected through card slots. These hardware devices operate under the control of an OS (Operating System) stored in a storage device.

Various application programs used in the electronic computer run under the OS. The OS controls all the operations of the electronic computer and absorbs differences in specifications of different hardware to provide an environment common to the application programs. In other words, the OS is software that provides basic functions used mutually by many application programs, e.g. input/output functions such as keyboard entry and screen output, and management of the disk and memory, and controls the whole system of the electronic computer. The OS is also known as "basic software".

The hardware devices of the electronic computer are produced by a plurality of manufacturers, and the specifications thereof may differ among manufacturers. It is desirable for developers of programs using electronic computers to develop application programs without noticing the differences in specifications of the hardware. The OS absorbs the differences in specifications of the hardware to provide an environment common to the application programs.

The developers of the application programs can save the time and labor for development and unify the operability of the application programs by making use of the function provided by the OS. An application program developed for a certain OS can basically be used in any electronic computer in which the OS can run.

There are a large number of different kinds of OS, represented by MS-DOS (registered trademark), UNIX (registered trademark), Linux, FreeBSD (registered trademark), etc. Among them, the Windows series available from Microsoft is the most popular OS for use by corporations and general home users. Mac OS (registered trademark) available from Apple is widely used in the DTP industry and the multimedia industry. Servers of corporations and scientific institutions often use UNIX-based OS's developed by various companies and UNIX-based OS's such as Linux and FreeBSD, which are distributed without charge. In recent years, Windows NT/2000 (registered trademark) available from Microsoft has been increasing the share of the market as an OS for servers.

[Conventional Architecture]

FIG. 12 outlines the architecture of Windows NT/2000 (registered trademark) as a typical OS. As will be understood from FIG. 12, Windows NT/2000 has generally a hierarchical structure comprising hardware 2, an OS 3, and an application program 4 that implements a function requested by the actual user. A microkernel 51 is a program for performing general management of the OS 3. Various software programs (kernel mode software) that run in layers above the layer of the microkernel 51 constitute a kernel mode 8 (see the description given later). The application program 4 in the topmost layer runs in a user mode 9 (see the description given later).

The OS 3 has a hierarchical structure that, roughly speaking, comprises an executive 50, a microkernel 51, and a hardware abstraction layer (HAL) 52. The HAL 52 is located in a layer immediately above the hardware 2. The HAL 52 is a program designed to attach importance to the control of hardware. The program absorbs differences in specifications of various hardware devices such as processors to provide the same environment (independent of models) for services in higher-order layers (the microkernel 51, the executive 50, etc.).

The microkernel 51 provides overall basic functions of the system. The executive 50 is an integrated whole of programs for implementing the provision of main services from the OS 3 by utilizing service functions provided by the microkernel 51 and the HAL 52. The executive 50 includes typical executive programs such as a cache manager 53, an object manager 54, a process manager 55, a memory manager 56, and an I/O manager 57.

The object manager 54 is a program for supervising a running object (a program for implementing a function to be performed for a certain purpose) and executing control and adjustment therefor. The process manager 55 is a program for supervising a process in progress (a program for performing only a certain function) and making adjustment therefor. The cache manager 53 and the memory manager 56 are programs for controlling and adjusting memory and virtual memory. The I/O manager 57 is a program for supervising and controlling the input/output function of the OS 3. The mode in which the electronic computer operates under the executive 50 is called "kernel mode 8".

In the kernel mode 8, any instruction for operating the OS 3 is executable. If an erroneous instruction is executed, there may be an adverse effect on the whole system. Further, the functions of the OS 3 include a user mode 9 that is completely open to the user to run an application program, etc. In the user mode 9, instructions for operating the OS 3 are limited so that an adverse effect is not exerted on the system. Because the system automatically intercepts instructions that may have an adverse effect on the system, an environment easy for the user to use is provided.

However, the provision of such a limitation is the same as limiting the functions of the OS 3. Therefore, the application program 4 that runs in the user mode 9 cannot directly access any part relating to the hardware 2 and has to pass through the kernel mode 8 to access the hardware 2. The kernel mode 8 enables full use of the functions of the OS 3 and also allows complete access to each input/output device. In addition, a program that runs in the kernel mode 8 is processed with priority to a program that runs in the user mode 9. Thus, high performance can be obtained.

Device drivers 5 belong to the OS 3. The device drivers 5 are software programs for managing external hardware devices of the electronic computer. The device drivers 5 run in the kernel mode 8. Usually, there is only one device for each device driver 5 that has the same attributes as those of the device driver 5. The application program 4 that runs in the user mode 9 has to pass through the device drivers 5 to access the respective devices.

For example, in a case where, as shown in FIG. 13, data is transferred from a device A to a device B, the flow of the data is as follows: "device A"→"device driver A"→(switching the operating mode from the kernel mode 8 to the user mode 9) "application program 4" (switching the operating mode from the user mode 9 to the kernel mode 8)→"device driver B"→"device B". Thus, the system carries out processing while switching the operating mode from the kernel mode 8 to the user mode 9 or from the user mode 9 to the kernel mode 8.

The switching between the user mode 9 and the kernel mode 8 is time-consuming processing. When a large amount of data such as image data is transferred, the transfer speed becomes slow, and hence an increased length of time is required to transfer the data. Accordingly, it is difficult to increase the transfer speed at the application level. The reason for this is that it is necessary to switch between the user mode 9 and the kernel mode 8 for each processing of the application program 4.

Here, let us explain the conventional operating procedure executed to transfer data between devices. FIG. 13 outlines the relationship between the application program 4 and the device drivers 5 on the one hand and the operating modes 8 and 9 on the other. As will be understood from the figure, the application program 4 runs in the user mode 9.

The device drivers 5 are incorporated in the OS 3 to run in the kernel mode 8. Devices 6 constituting the hardware 2 of the electronic computer comprise various internal devices and external devices connected to the electronic computer. Each device 6 is controlled from a device driver 5 specific thereto. In other words, all accesses to the devices 6 are made through the respective device drivers 5. The device drivers 5 run in response to instructions from the application program 4 through the OS 3.

Next, the flow of data transmission will be explained with reference to the flowchart of FIG. 14. Let us explain the flow of data as transferred from the device A to the device B by the application program 4, which runs in the user mode 9, while comparing the operating modes 8 and 9 of the system. First, the application program 4 sends a data transfer request (instruction) (S50).

At this time, a data transmission request is sent to the device A (S51), and a data reception request is sent to the device B (S52). The operating mode of the system is switched from the user mode 9 to the kernel mode 8. The device driver A receives the data transmission request (S53) and transmits it to the device A (S54). The device A receives the data transmission request (S55) and transmits data (S56). The device driver A receives the transmitted data (S57) and internally processes the data (S58) and then transmits the processed data to the application program 4 (S59).

The operating mode of the system is switched from the kernel mode 8 to the user mode 9. The application program 4 receives and processes the data (S60 and S61) and transmits the processing result to the device driver B (S62). The operating mode of the system is switched from the user mode 9 to the kernel mode 8 again. The device driver B receives the data (S63) and internally processes the received data (S64) and then transmits the processing result to the device B (S65).

The device B receives the data (S66) and sends information indicating the receipt of the data to the device driver B (S67). The device driver B receives the data receipt information (S68) and informs the application program 4 of the completion of the data transfer (S69). The system is switched to the user mode 9. The application program 4 receives the data transfer completion information (S70) and starts the next processing. Thus, the series of data transfer processing operations ends (S71).

Thus, data is transferred as follows: "device A"→"device driver A"→(switching between the operating modes) "application program 4" (switching between the operating modes) "device driver B"→"device B". During the data transfer, the system operates while repeatedly switching the operating mode between the kernel mode 8 and the user mode 9. As the amount of data to be handled increases, the number of operating mode switching operations increases.

Further, when another application program is simultaneously running on the system, the system switches between the operating modes for this application program. Consequently, the number of times of switching between the operating modes performed in the system becomes large as a whole, causing a delay in the execution processing of the application programs. The increase in the number of times of switching between the operating modes is likely to cause a reduction in the speed of data transmission/reception processing. In particular, when there is a strong demand for real-time execution capability for image processing or the like, the increase in the number of times of switching between the operating modes may cause disordering of the image displayed on the screen.

To ensure the required system performance in the above-described system, it is important to advance the technology for developing and designing hardware devices and the technology for developing the device drivers 5 for controlling the pieces of hardware 2. To transfer a large amount of data such as image data, in particular, it is desirable to minimize the number of times of switching between the user mode 9 and the kernel mode 8 to thereby increase the speed of data transfer. When there is a strong demand for ensuring the integrity of data, it is desirable that data should be transferred in the kernel mode 8, in which no data can be touched by the user. Particularly, when user authentication is performed by using a password, the integrity of password data, which is confidential data, is very important.

(Explanation of File System)

A named set of data stored in a storage device is defined as a "file". When the number of files stored in the storage device increases, it is demanded that these files should be functionally managed. It is a general practice to manage a plurality of files compiled in the form of a directory. The directory not only stores files but also allows another directory to be stored therein. Thus, the directory can be formed into a nested structure. The directory is likely to become a hierarchical structure in the form of a tree structure as a whole. An overall structure comprising a collection of files is known as a "file system".

There are various kinds of file systems. Typical examples of file systems are an FAT file system, an NTFS log-base file system, and an HPFS file system. The access to a file stored in a storage device, e.g. a hard disk, of an electronic computer is controlled by a file system driver.

FIG. 15 shows the relationship between the application program 4, an I/O manager 57, a file system driver 58, a disk driver 59, and a hard disk 60. A read request from the application program 4 is sent to a system service provided by the I/O manager 57 in the kernel mode 8.

In the case of Windows NT (hereinafter referred to as "NT"), I/O subsystems constitute a framework for controlling peripheral devices and providing an interface with these devices. The I/O subsystems comprise all kernel mode drivers. The I/O manager 57 defines and manages the whole of the I/O subsystems. The file system driver 58 is a component of the I/O subsystems. The file system driver 58 has to conform to an interface defined by the I/O manager 57.

The file system driver 58 provides the user with a means for storing information in an auxiliary storage device, e.g. the hard disk 60, and a function of retrieving information stored in the auxiliary storage device. Further, the file system driver 58 has the function of performing creation, revision and deletion of the files stored in the auxiliary storage device and easily and reliably controlling information transfer between the files. The file system driver 58 is also provided with the function of constructing the contents of a file by a method suitable for the application program 4.

File attribute data consists of information concerning a file stored in the auxiliary storage device as to whether the file is a read-only file or a writable file. File systems used in electronic computers have such file attribute data set in detail. The file attribute data includes pieces of information such as the date and time of creation of a file, the date and time of updating of the file, the kind and size of the file, information as to whether or not the file is a read-only file (designatable), and information as to whether or not the file is a hidden file (designatable).

When a file is to be accessed, the file system driver checks the access method by referring to the attributes of the file. In the case of a read-only file, it is not writable. Therefore, the file system driver returns a notice to the user trying to make write access that the file is not writable. It has been set that a file can be accessed only by the access method determined in the file attributes.

In NT, access right to access a file has been set. For example, in NT, a user logging in when the system is started is classified into a level or a group, for example, as "administrator" or "user 1". It is possible to set an accessible file and an inaccessible file for each user. It is also possible to set a file so that it is a read-only file for one user but writable for another.

It is very difficult when using the conventional file system to limit so that a user can access a file only a predetermined number of times (access to read, write, open, etc.). It is also difficult to set each file so that the file can be accessed only in a predetermined time period or time zone. To make each file accessible only in a predetermined time period or time zone, the attributes of the file need to be changed and rewritten for each time.

It is also difficult to set a file so that when a user (a user of the electronic computer or an application program) accesses the file a predetermined number of times (access to read, write, open, etc.), the file is deleted. Thus, it is difficult to control files in response to a specific access made by the user.

With the above-described technical background, the present invention was made to attain the following objects.

An object of the present invention is to provide a method of controlling the access to a file stored in a storage device of an electronic computer in a kernel mode, and also provide a program for the method and a storage medium containing the program.

Another object of the present invention is to provide a method of obtaining an access log of accesses to a file system of an electronic computer in a kernel mode, and also provide a program for the method and a storage medium containing the program.

Still another object of the present invention is to provide a method of transferring a file containing an access log of accesses to a file system of an electronic computer to a network, and also provide a program for the method and a storage medium containing the program.

A further object of the present invention is to provide a method wherein a file in a file system of an electronic computer is controlled under predetermined conditions after a specific access has been made to the file a predetermined number of times, and also provide a program for the method and a storage medium containing the program.

A still further object of the present invention is to provide a method of performing personal authentication of a user of an electronic computer and controlling the access to the electronic computer from the user, and also provide a program for the method and a storage medium containing the program.

The method of controlling a file system driver of an electronic computer and the program for the method and further the storage medium containing the program according to the present invention have the following advantages.

In the present invention, access to a file system of an electronic computer is performed in a kernel mode that is an operating mode of an OS used in the electronic computer. Therefore, the access can be controlled without interference with the file system driver. Because the access control is effected by using a database specifying access to the file system, it becomes free to control the access to a file.

In the present invention, the access to the file system is controlled by using an interface common to an application program and device drivers and utilizing the program of the interface driver. Therefore, the confidentiality of data is protected, and safe transfer of data can be achieved.

In the present invention, an accessible range and access right are set for each user, and the personal authentication of a user of the electronic computer is performed. The access to the file system can be controlled in the kernel mode on the basis of the set accessible range, within which the user can make access, and the set access right. Thus, it is possible to prevent unauthorized access, an unregistered user's access, and so forth.

DISCLOSURE OF THE INVENTION

The method of controlling a file system driver of an electronic computer according to the present invention is characterized as follows. Access to a specific file is received in a kernel mode that is an operating mode in which all instructions of the OS are executable. Then, an access control database comprising filenames in the file system and access methods is referenced to judge whether or not the access to the specific file conforms to conditions prescribed in the access control database. If the access to the specific file does not conform to the conditions, the access is canceled.

Preferably, if the access conforms to the conditions, the access is transmitted to a file system driver for controlling the file system, and a predetermined change is made to an access method corresponding to the specific file in the access control database.

Preferably, the access comprises at least one of control operations of creating a file, opening a file, closing a file, reading a file, and writing a file, and has the number of execution of control process.

Preferably, the access is canceled when the number of execution of control process has become less or more than a preset value.

Preferably, the history of the access is stored as a log file, and the log file is transferred to another electronic computer connected to the above-described electronic computer directly or through a network.

Preferably, when the access is made from an input device of the electronic computer, input data is analyzed, and the function of the input device is stopped according to the result of the analysis.

Preferably, personal authentication is performed by using each individual's data entry characteristics exhibited when entering data from the keys of a keyboard, to identify a user. Then, the access control database is referenced to obtain the conditions indicating an accessible range within which the user can make access, and the user's access is controlled according to the conditions.

Preferably, a control database having the conditions indicating an accessible range within which the user can make access has previously been stored in a storage device of a server connected to the electronic computer through a network. The above-described personal authentication is performed at the server. The conditions for the user identified by the personal authentication are obtained by retrieval from the control database. The server transmits an instruction for controlling the user's access to the electronic computer. The electronic computer controls the user's access according to the instruction so as to effect at least one of the following: access limitation; access cancellation; and system lock.

The program for controlling a file system driver of an electronic computer and the storage medium containing the program according to the present invention are characterized as follows.

The program comprises application interface means for receiving the access instruction in a kernel mode that is an operating mode in which all instructions of the OS are executable; flow control means for analyzing the access instruction and for controlling the flow of data; referencing means for referencing an access control database comprising a column of filenames in the file system and a column of at least one access method and for outputting a referencing result; data processing means for passing information concerning the specific file and the access instruction to the referencing means and for receiving the referencing result relative to the access instruction to make judgment; a file system driver for controlling the file system; and file system supervising driver means for receiving and passing the access instruction to the file system driver and for receiving a result of execution of the access instruction from the file system driver.

Preferably, the specific file and the access method obtained as a result of analysis made by the flow control means are passed to the data processing means. If the result of the judgment made by the data processing means is "abnormal", the data processing means cancels the access instruction.

Preferably, the specific file and the access method obtained as a result of analysis made by the flow control means are passed to the data processing means. If the result of the judgment made by the data processing means is "normal", the data processing means passes the access instruction to the file system supervising driver means, and the data processing means creates an access log.

Preferably, the referencing means enters a change corresponding to the access instruction into the access control database.

Preferably, the data processing means makes the above-described judgment in such a manner that if the value in the column of access method for the specific file is a predetermined value, the data processing means outputs the "abnormal" result.

Preferably, the data processing means outputs an access log of the above-described access.

It is also preferable to receive and analyze the input data from the input means and to provide specific data in the input data to the application interface means.

Preferably, the input means is a keyboard, and the above-described stopping of the function is stopping of input data entered from a specific key of the keyboard.

Preferably, the input means is a mouse, and the stopping of the function is stopping of specific data entered from the mouse.

Preferably, the storage means of the electronic computer contains a personal authentication program for performing personal authentication of a user using the electronic computer. The personal authentication program comprises means for obtaining key entry data entered from keys of a keyboard; first authentication means for performing the personal authentication using data entry characteristics exhibited when entering the key entry data to identify the user; means for obtaining the conditions indicating an accessible range within which the user can make access by referencing the access control database; and control means for transmitting the conditions to the flow control means to control the user's access.

Preferably, storage means of a server connected to the electronic computer through a network contains a control program and a control database comprising users' personal information and control conditions, and the electronic computer has transmission means for transmitting the key entry data to the server. Preferably, the control program has reception means for obtaining transmission data transmitted by the transmission means; second authentication means for performing the personal authentication using data entry characteristics exhibited when entering the key entry data, which is included in the transmission data, to identify the user; database referencing means for obtaining the conditions indicating an accessible range within which the user can make access by referencing the control database; and control condition transmitting means for transmitting the conditions and a control instruction to the electronic computer to control the user's access.

Preferably, the method of controlling a file system driver of an electronic computer and the program for the method and further the storage medium containing the program according to the present invention perform personal authentication when the user logs in to the electronic computer or perform on-line authentication continuously.

Preferably, the system of the electronic computer is locked or unlocked in response to an instruction from the server. Preferably, when the power to the electronic computer is turned on after it has been turned off with the electronic computer placed in the locked state, the electronic computer is reset with the operating environment thereof maintained in the condition immediately before the turning off of the power.

BRIEF DESCRIPTION OF THE DRAWINGS

FIG. 6 shows an example of a file attribute database.

FIG. 7 shows an example 1 (a) and an example 2 (b) of a control condition database.

FIG. 8 shows an example of the access log database.

FIG. 20 is a diagram showing an example of input data in the fifth embodiment.

FIG. 23 is a diagram showing an example of identification results in the fifth embodiment.

FIG. 24 is a diagram showing an example of a control database.

BEST MODE FOR CARRYING OUT THE INVENTION

Embodiments of the present invention will be described below.
(Concept of Common Interface Driver)

Figure 1:
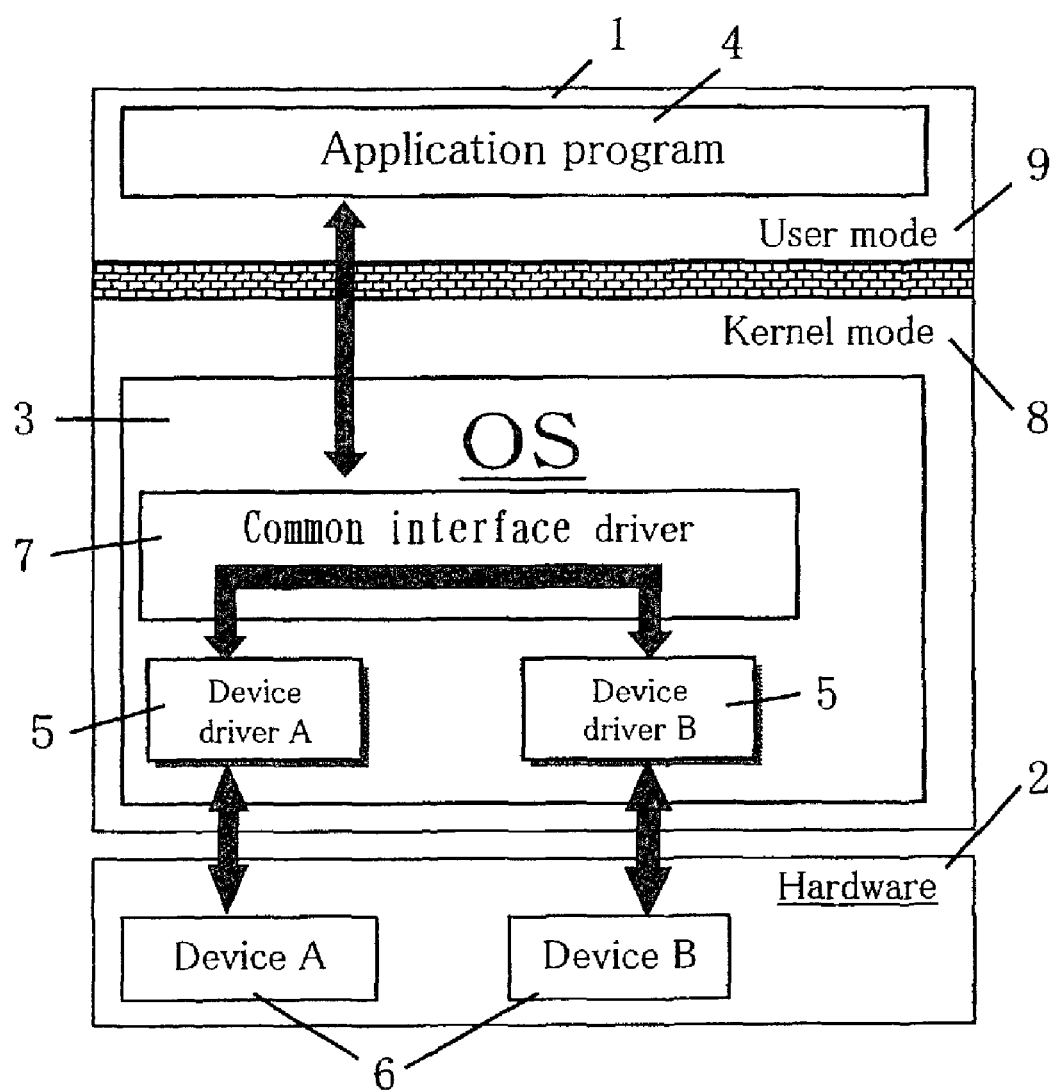
FIG. 1 is a conceptual view showing an embodiment of the present invention.
Figure 2:
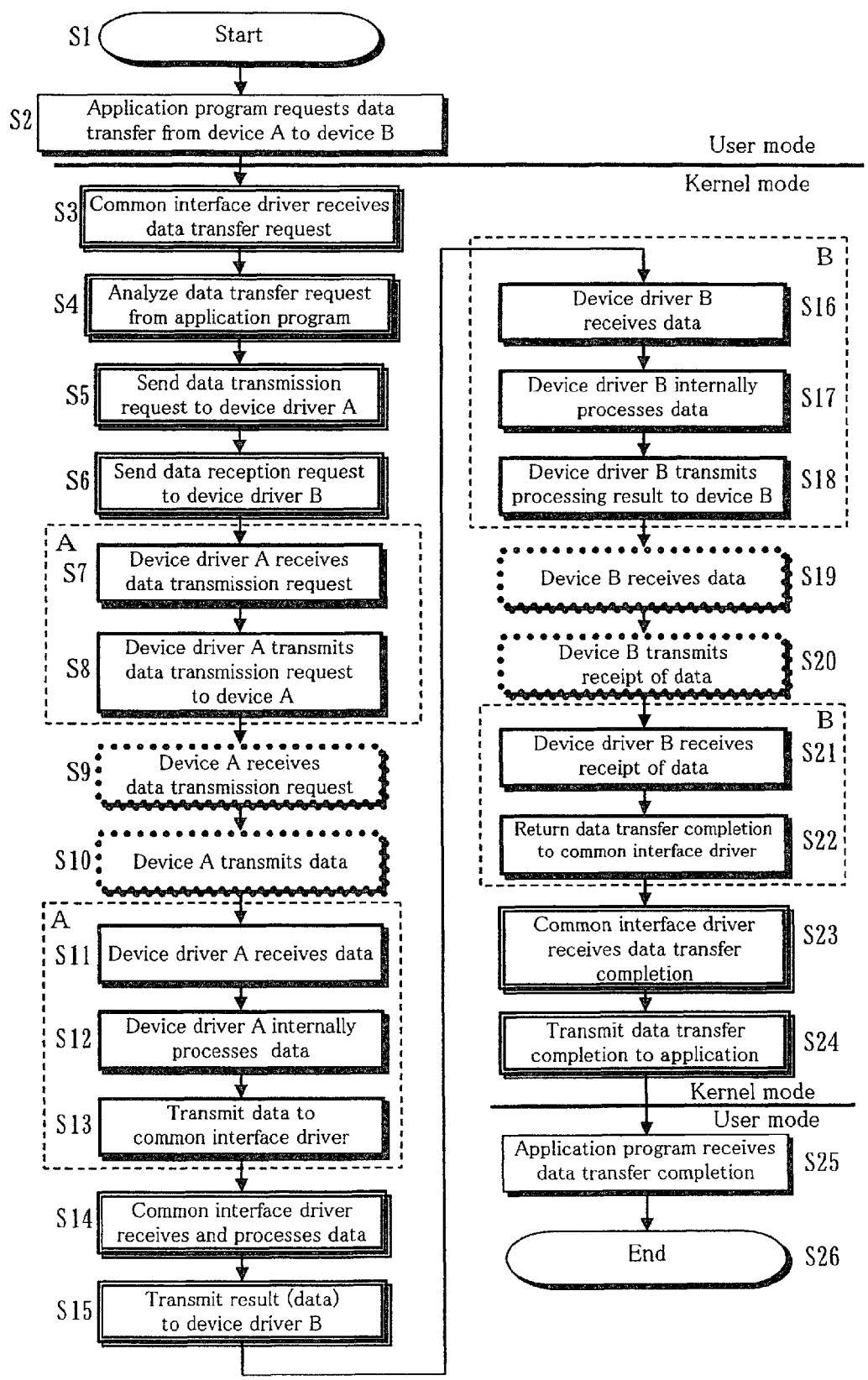
FIG. 2 is a flowchart showing the operation of the embodiment of the present invention.

FIG. 1 is a conceptual view showing an embodiment of an interface driver program used in an electronic computer according to the present invention. FIG. 1 is a conceptual view of an OS using a common interface driver. FIG. 2 is a flowchart showing the flow of data and instructions when data is transferred.

An electronic computer 1 comprises hardware 2 such as a CPU, memories, and peripheral devices. These pieces of hardware 2 are operated under control of an OS 3 stored in a storage device. An application program 4 used by an end user runs in an environment provided by the OS 3. The OS 3 includes device drivers 5 for controlling peripheral devices. The device drivers 5 control respective devices 6 according to instructions from the application program 4 to receive data from the devices 6 and to transmit data to the devices 6.

In this embodiment, a common interface driver 7 serves as a window common to the device drivers 5 through which exchange of data between the application program 4 and the device drivers 5 is performed collectively. It is also possible to control transmission and reception of data between the devices 6 according to instructions from the application program 4. The common interface driver 7 is an interface between the device driver A5 and the device driver B5, which operates in a kernel mode 8.

The devices 6 include a device A and a device B, which are controlled by a device driver A and a device driver B, respectively. The flow of data when it is transferred from the device A to the device B is shown in the flowchart of FIG. 2. When the application program 4 that runs in a user mode 9 needs to transfer data from the device A to the device B (S1), it sends a data transfer request (instruction) (S2). At this time, the operating mode of the system is the user mode 9.

The operating mode of the system is switched to the kernel mode 8. The common interface driver 7 receives the data transfer request from the application program 4 (S3). The common interface driver 7 analyzes the data transfer request (S4) to give instructions to various processing sections. The common interface driver 7 sends a data transmission request to the device driver A (S5). The common interface driver 7 sends a data reception request to the device driver B (S6).

The device driver A receives the data transmission request from the common interface driver 7 (S7) and transmits it to the device A (S8). The device A receives the data transmission request (S9) and transmits data to the device driver A (S10). The device driver A receives the data (S11), internally processes it (S12) and transfers the processed data to the common interface driver 7 (S13). The common interface driver 7 receives the data and subjects it to processing, e.g. compression and encryption, (S14) and then transmits the result of the processing to the device driver B (S15).

The device driver B receives the data from the common interface driver 7 (S16), internally processes it (S17) and transmits the result of the internal processing to the device B (S18). The device B receives the data (S19) and sends information indicating the receipt of the data to the device driver B (S20). The device driver B receives the data receipt information (S21) and sends information indicating the completion of the data transfer to the common interface driver 7 (S22).

The common interface driver 7 receives the data transfer completion information (S23), sends the data transfer completion information to the application program 4, and waits for a subsequent instruction (S24). At this time, the operating mode of the system is switched from the kernel mode 8 to the user mode 9. The application program 4 receives the data transfer completion information (S25) and starts subsequent processing.

Thus, the series of data transfer operations ends (S26). As stated above, data is transferred as follows: "device A"→"device driver A"→"common interface driver 7"→"device driver B"→"device B". During the transfer of the data, the system operates in the kernel mode 8, and it is unnecessary to switch between the operating modes.

Further, data is transferred between the devices 6 directly in the kernel mode 8 without passing through the application program 4 in the user mode 9. Accordingly, it becomes possible to transfer a large amount of data at high speed. In addition, because data is transferred in the kernel mode 8, in which no data can be handled directly from the application program 4, the integrity of data is enhanced.

When the device B includes various devices such as input devices, e.g. a keyboard and a mouse, the devices have respective device drivers. These device drivers 5 are connected to the common interface driver 7 in parallel to exchange data with each other or with the application program 4 through the common interface driver 7.

The common interface driver 7 has functions to execute various processing, including data compression, encryption and decryption. When requested from the application program 4, the common interface driver 7 performs high-speed transmission and reception of data between the devices 6 or between the application program 4 and the devices 6 by using these functions.

In addition, the common interface driver 7 has a time stamp function to indicate the time of received data, thereby being capable of putting a time stamp on data received from the devices 6 and so forth. By using the time stamp function, it is possible to accurately grasp information concerning the time of entry of data made from the devices 6.

In particular, when data entry time is important as in the case of personal authentication using the user's data entry characteristics, e.g. those exhibited when entering key entry data, even more accurate time can be grasped.

First Embodiment of Common Interface Driver

Figure 3:
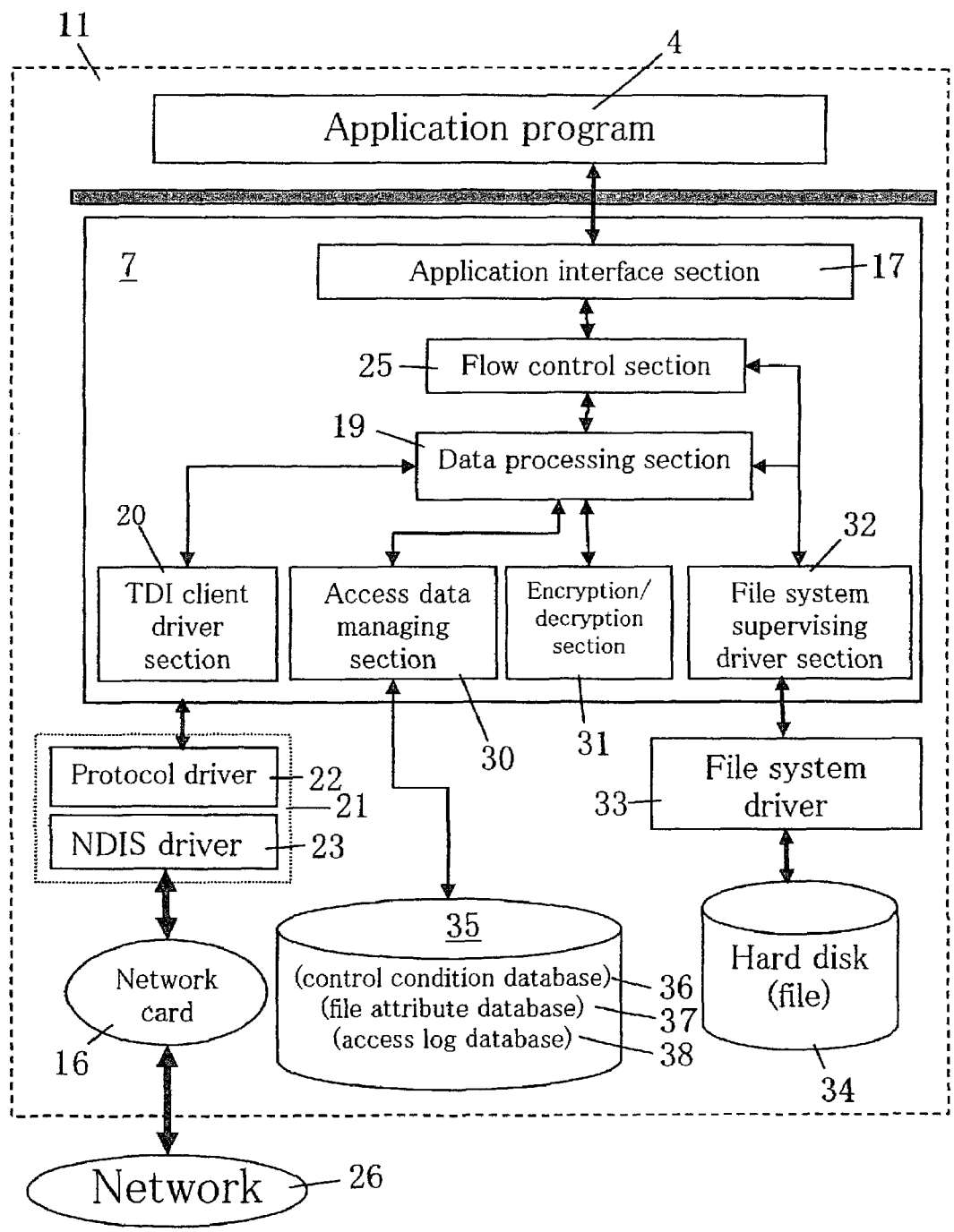
FIG. 3 is a block diagram of a common interface driver.
Figure 4:
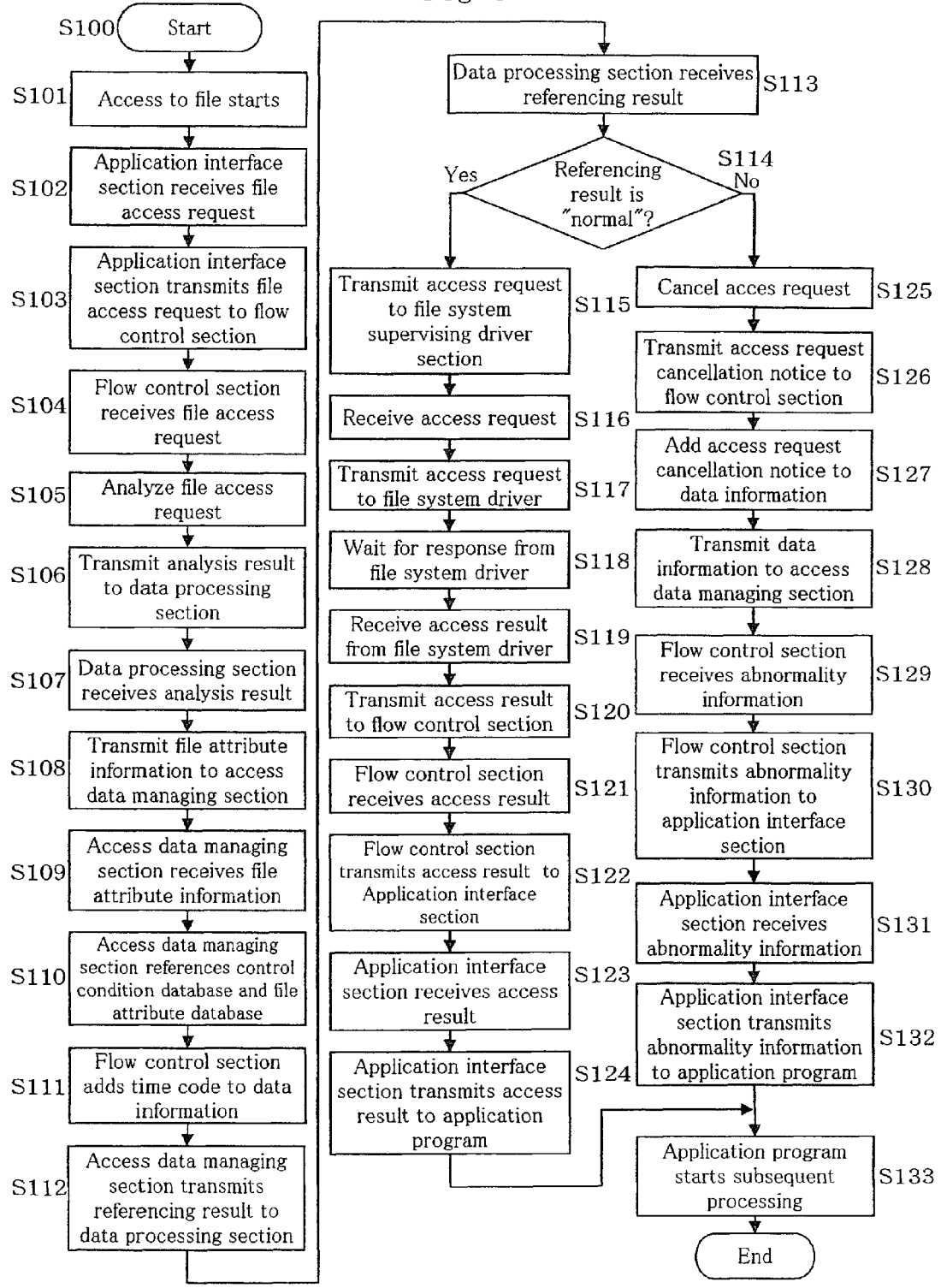
FIG. 4 is a flowchart showing the operation of the system shown in FIG. 3.

The following is a description of a first embodiment of the file access control using the common interface driver 7 that runs in the kernel mode 8. FIG. 3 shows a mode of controlling access made to a file stored in a hard disk 34 of an electronic computer 11. FIG. 4 is a flowchart showing the flow of the access control.

To access a file stored in the hard disk 34 from an application program 4 running on the electronic computer 11, the application program 4 sends a request for access to the file through an interface provided by the standard specifications of Windows. At this time, the application program 4 exchanges data with the hard disk 34 via the common interface driver 7.

The common interface driver 7 comprises an application interface section 17, a flow control section 25, a data processing section 19, a TDI client driver section 20, an access data managing section 30, an encryption/decryption section 31, a file system supervising driver section 32, and so forth. The outline of the function of each section is as follows.

The file system supervising driver section 32 performs transmission and reception of data to and from a file system driver 33 in response to a request from the flow control section 25 or the data processing section 19. The application interface section 17 provides an interface between the application program 4 and the common interface driver 7. The application interface section 17 receives a command such as a file access request from the application program 4 and transmits the result of the execution of the command or other data received from the flow control section 25 to the application program 4.

The data processing section 19 produces file attribute data and performs input and output of data to and from the access data managing section 30, the encryption/decryption section 31 and the TDI client driver section 20.

The TDI client driver section 20 provides an interface between a network driver 21 and the common interface driver 7. The network driver 21 comprises a protocol driver 22 and an NDIS (Network Driver Interface Specification) driver 23. The network driver 21 controls a network card 16 to establish connection and to control the protocol when data is transmitted to a network 26.

The protocol driver 22 controls the communication protocol when data is transferred to the network 26. The NDIS driver 23 provides an interface between the protocol driver 22 and the network card 16. The TDI client driver section 20 receives packeted data from the data processing section 19 and outputs it to the protocol driver 22.

The flow control section 25 analyzes an instruction or the like from the application program 4 received through the application interface section 17 and gives instructions to the data processing section 19, the file system supervising driver section 32, etc. to control them.

The access data managing section 30 manages a database 35 containing information concerning filed stored in the hard disk 34 or other auxiliary storage device. That is, the access data managing section 30 references the database 35, enters data thereinto, and controls it. More specifically, the access data managing section 30 enters or deletes data such as an access log of accesses to files, control conditions, and file attributes in the database 35 and references the data stored therein.

The file system supervising driver section 32 provides an interface between the common interface driver 7 and the file system driver 33 that provides access to a file stored in the hard disk 34 or other auxiliary storage device.

Next, the flow of data through the common interface driver 7 will be described with reference to the flowchart of FIG. 4.

To access a file, the application program 4 outputs a file access request through an interface provided by the standard specifications of Windows (S100 and S101). The application interface section 17 of the common interface driver 7 receives the access request (S102) and transmits the file access request to the flow control section 25 (S103).

The flow control section 25 receives the file access request (S104), analyzes it (S105), and transmits the result of the analysis to the data processing section 19 (S106). The data processing section 19 receives the analysis result (S107), produces file attribute information for referencing file access information and transmits the file attribute information to the access data managing section 30 (S108). The access data managing section 30 receives the file attribute information (S109) and references a control condition database 36 and a file attribute database 37 in the database 35 (S110).

Then, the flow control section 25 adds a time code to data information (S111). The access data managing section 30 transmits the referencing result to the data processing section 19 (S112). The data processing section 19 receives the referencing result (S113) and judges whether or not the referencing result is "normal" (S114). If the referencing result is judged to be "normal" (if "Yes" is the answer), the data processing section 19 transmits the file access request to the file system supervising driver section 32 (S115). The file system supervising driver section 32 receives the file access request (S116) and transmits it to the file system driver 33 (S117). Then, the file system supervising driver section 32 waits for a response from the file system driver 33 (S118).

The file system driver 33 accesses the hard disk 34 to perform a file operation and transmits the result of the access to the file system supervising driver section 32. The file system supervising driver section 32 receives the access result (S119) and transmits it to the flow control section 25 (S120).

The flow control section 25 receives the access result (S121) and transmits it to the application interface section 17 (S122). The application interface section 17 receives the access result (S123) and transmits it to the application program 4 (S124). The application program 4 receives the response to the file access request and starts the subsequent processing (S133).

If the result of the judgment made by the data processing section 19 is not "normal" (if "No" is the answer at step 114), the data processing section 19 cancels the access request (S125) and transmits a notice of cancellation of the access request to the flow control section 25 (S126). The data processing section 19 adds the access request cancellation notice to the data information (S127) and transmits the data information with the notice to the access data managing section 30 as abnormality information (S128).

The flow control section 25 receives the abnormality information indicating the cancellation of the access request (S129) and transmits it to the application interface section 17 (S130). The application interface section 17 receives the abnormality information (S131) and transmits it to the application program 4 (S132). The application program 4 receives the response to the file access request and starts the subsequent processing (S133).

(Transfer Flow Concerning Access Log Database 38)

Figure 5:
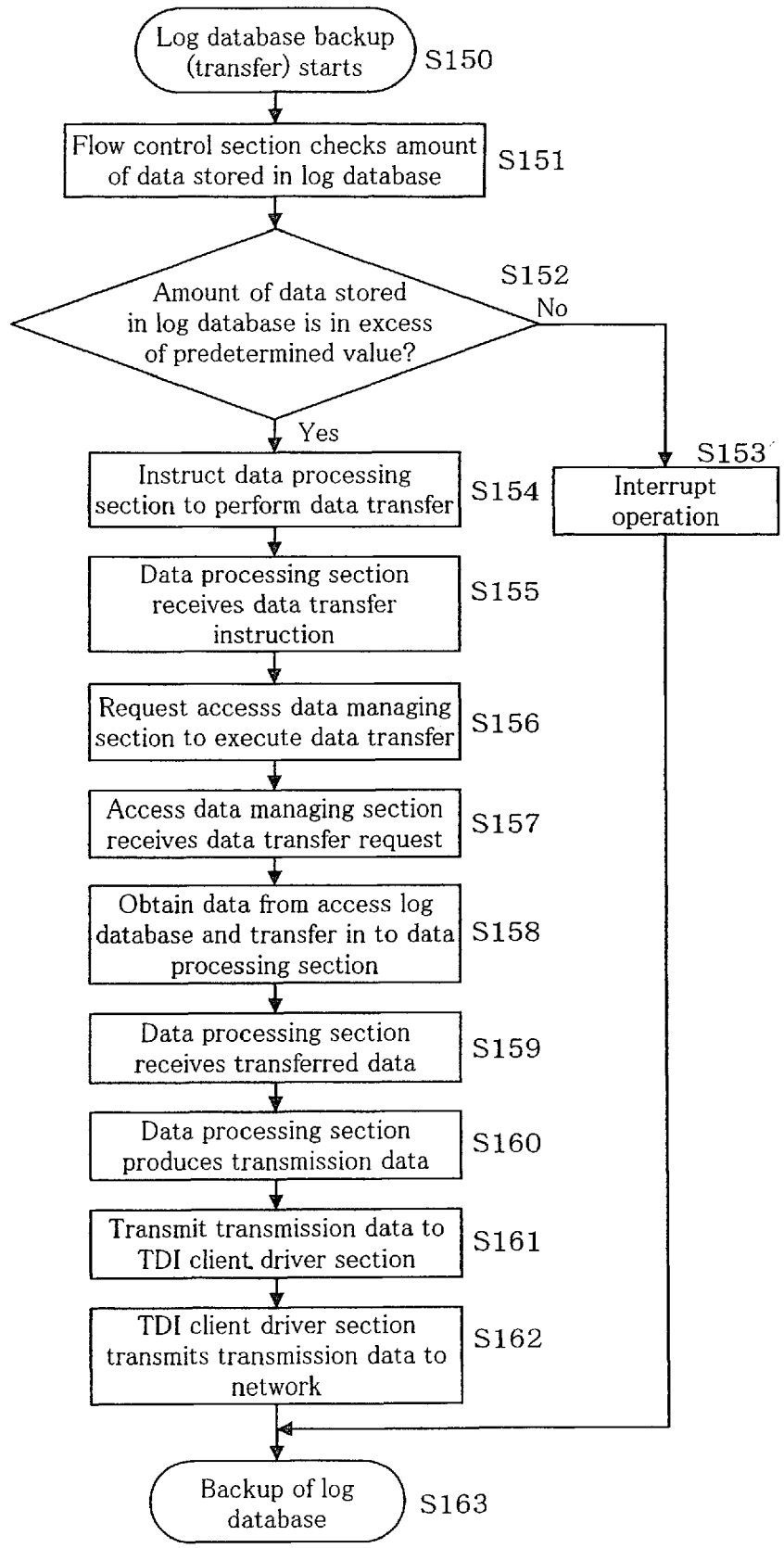
FIG. 5 is a flowchart showing a data transfer procedure for an access log database.

The following is a description of the backup of the database 35 shown in FIG. 5.

The flow control section 25 supervises the amount of data stored in the access log database 38. When the amount of data stored in the access log database 38 exceeds a predetermined value, the flow control section 25 outputs an instruction for executing a backup operation or for transferring the data to a server on the network 26. That is, the flow control section 25 outputs an instruction for starting the operation (S150), and checks the amount of data stored in the access log database 38 (S151). The flow control section 25 judges whether or not the amount of data stored in the access log database 38 is in excess of a predetermined value (S152). If the amount of data stored in the access log database 38 is not in excess of the predetermined value (if "No" is the answer), the operation is interrupted (S153) and terminated (S163).

If the amount of data stored in the access log database 38 is in excess of the predetermined value (if "Yes" is the answer), the flow control section 25 instructs the data processing section 19 to transfer data from the access log database 38 (S154). The data processing section 19 receives the data transfer instruction (S155) and requests the access data managing section 30 to execute data transfer (S156). The access data managing section 30 receives the data transfer request (S157), obtains data from the access log database 38 and transfers the data to the data processing section 19 (S158). The data processing section 19 receives the transferred data (S159) and produces transmission data to be transmitted to the network 26 (S160).

If it is necessary to execute encryption processing for data security protection when transmission data to be transmitted to the network 26 is produced, the data is subjected to encryption processing in the encryption/decryption section 31. The encrypted data is packeted to transmit it to the network 26, thereby producing transmission data (S161). The transmission data is sent to the TDI client driver section 20. The TDI client driver section 20 transmits the transmission data to the network 26 (S162). Thus, a series of operations ends (S163).

Example of File Attribute Data

FIG. 6 illustrates an example of the arrangement of the file attribute database 37. The file attribute database 37 comprises the columns respectively entitled "Filename" 101, "Creation Date" 102, "Updating Date" 103, "Access Date" 104, "Hidden File" 105, "Read-Only" 106, "Size" 107 and "Access Authorized User" 108. "Filename" 101 is a name of a file, which also includes an extension identifying the type of the file. "Filename" 101 may include a filename with a path.

"Creation Date" 102 is the date at which a file was created. "Updating Date" 103 is the date at which the file was last updated. "Access Date" 104 is the last date at which the file was accessed. To make a file invisible normally, "Yes" is entered in the column of "Hidden File" 105. To make the file visible normally, "No" is entered in the column of "Hidden File" 105. To make a file read-only, "Yes" is entered in the column of "Read-Only" 106. To make the file not read-only, "No" is entered in the column of "Read-Only" 106. The column of "Size" 107 expresses the size of a file in terms of bytes. The column of "Access Authorized User" 108 shows the attributes of a user who can access the file.

For example, "open" 109 indicates that the file is accessible by anyone, and "owner" 110 indicates that the file is accessible only by a user who logged in the system as an "owner". "Administrator" 111 is an administrator of the system. It is also possible to designate a specific user (Taro) in combination with a password (pswd01) as shown by "Taro/pswd" 112.

Example of Control Condition Database

FIG. 7 illustrates two examples of the arrangement of the control condition database 36. In the example shown in Table (a) of FIG. 7, the control condition database 36 comprises the columns respectively entitled "Filename" 101, "Create" 113, "Open" 114, "Close" 115, "Read" 116 and "Write" 117. "Filename" 101 is a name of a file, which also includes an extension. Preferably, "Filename" 101 also includes the path of the file. The columns following the column of "Filename" 101, i.e. "Create" 113, "Open" 114, "Close" 115, "Read" 116, and "Write" 117, indicate file access methods, which respectively mean creating, opening, closing, reading, and writing of a file.

It can be predetermined that if "0" has been set in a certain column, access corresponding to the column cannot be made. It can also be predetermined that if a numeral not less than 1 has been set in a certain column, access corresponding to the column can be made. In this case, the set numerical value may be decremented every time the user makes access. Thus, the set numeral can be rewritten. These operations can be performed by the data processing section 19 and the access data managing section 30. Thus, access can be managed with a counter.

In the case of "C:¥folder1¥filename01.abc", for example, the value "4" is in the column of "Write" 117. If the value is decremented by 1 every time write access is made, it is possible to make write access up to 4 times. After access has been made 4 times, the value becomes "0". Hence, it becomes impossible to make write access. The same is the case with the other columns. With the control condition database 36 arranged as stated above, it becomes possible to perform file access management and control with a counter and hence free to manage and control the access to a file according to the type and method of the access to the file.

In the second example shown in Table (b) of FIG. 7, the column entitled "User" 118 is additionally provided to perform the above-described access control with a counter for each user. That is, file access control is performed for each user, for example, "Taro" as shown in Table (b) of FIG. 7. Other columns may be added for file management, such as "Period" 119 indicating the period of time during which the file concerned is accessible, and "Time Zone" 120 indicating the time zone during which the file concerned is accessible. In the column of "Period" 119, the beginning and the end of a period of time are expressed by year, month and day. In the column of "Time Zone" 120, the beginning and the end of a time zone are expressed in 24-hour notation. In either case, the beginning and the end are separated from each other by the mark ":".

In this case, a certain user 118 can access a file with a registered filename 101 only by a predetermined method and only in a registered specific time zone 120 within a registered specific period 119. With respect to "C:¥folder1¥filename01.abc", for example, Taro, Hanako, and Everyone can read (the value is not less than 1). However, the time zone 120 during which they can access the file is between 9 hours 30 minutes and 17 hours 30 minutes for Taro, between 14 and 17 hours for Hanako, and between 8 and 22 hours for Everyone.

Example of Access Log Database

FIG. 8 illustrates an example of the arrangement of the access log database 38 containing an access log of accesses to files. The access log database 38 comprises the columns respectively entitled "User" 118, "Filename" 101, "Create" 113, "Open" 114, "Close" 115, "Read" 116, "Write" 117, and "Time Code" 121. "User" 118 is a name of a user who accessed the file concerned. "Filename" 101 is a name of a file that a user 118 accessed. It is desirable that "Filename" 101 should be associated with an extension of the file and a path indicating the location where the file has been stored.

The columns of "Create" 113, "Open" 114, "Close" 115, "Read" 116 and "Write" 117 indicate ways in which access was made. The value "1" indicates access that was made to perform a particular file operation. "Time Code" 121 indicates the date and time at which access was made. For example, it will be understood from the access log database 38 that "C:¥folder1¥filename01.abc" was created [the value in "Create" 113 is "1"] at 18 hours 6 minutes 0 second on Dec. 10, 2001 and this file was opened [the value in "Open" 114 is "1"] at 1 hour, 6 minutes and 30 seconds on Jan. 5, 2002. The user 118 at that time was "Taro".

The access log database 38 is created in the data processing section 19 according to instructions from the flow control section 25 and written in the database 35 by the access data managing section 30. When the amount of data stored in the access log database 38 exceeds a predetermined value, the data is transferred to a server or an electronic computer on the network 26 and stored therein. It is also possible to store the data in a local auxiliary storage device, e.g. the hard disk 34, for data backup.

Second Embodiment

Figure 9:
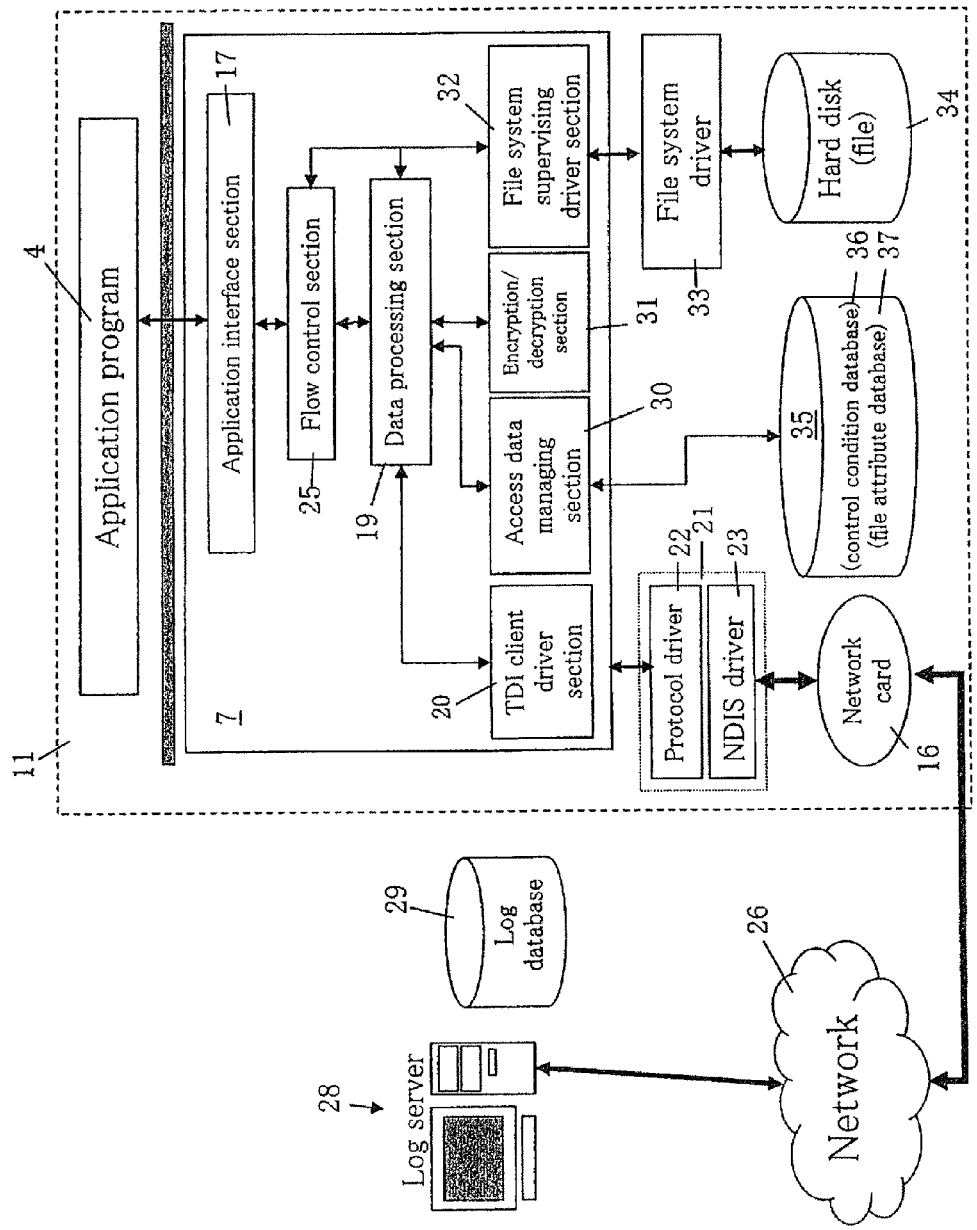
FIG. 9 is a conceptual view showing a second embodiment of the present invention.

FIG. 9 is a conceptual view of a second embodiment. The second embodiment is basically the same as the first embodiment. In the following, only a part of the second embodiment in which it differs from the first embodiment will be described. The electronic computer 11 is connected to a log server 28 through the network 26. The log server 28 has a log database 28 to store therein an access log transmitted from the electronic computer 11.

In the second embodiment, when an access instruction is issued from the application program 4, the data processing section 19 produces transmission data to be transmitted to the network. The transmission data is transmitted directly to the log server 28 by the TDI client driver section 20. Accordingly, the database 35 comprises the control condition database 36 and the file attribute database 37. The access data managing section references, changes and updates the control condition database 36 and the file attribute database 37.

Figure 10:
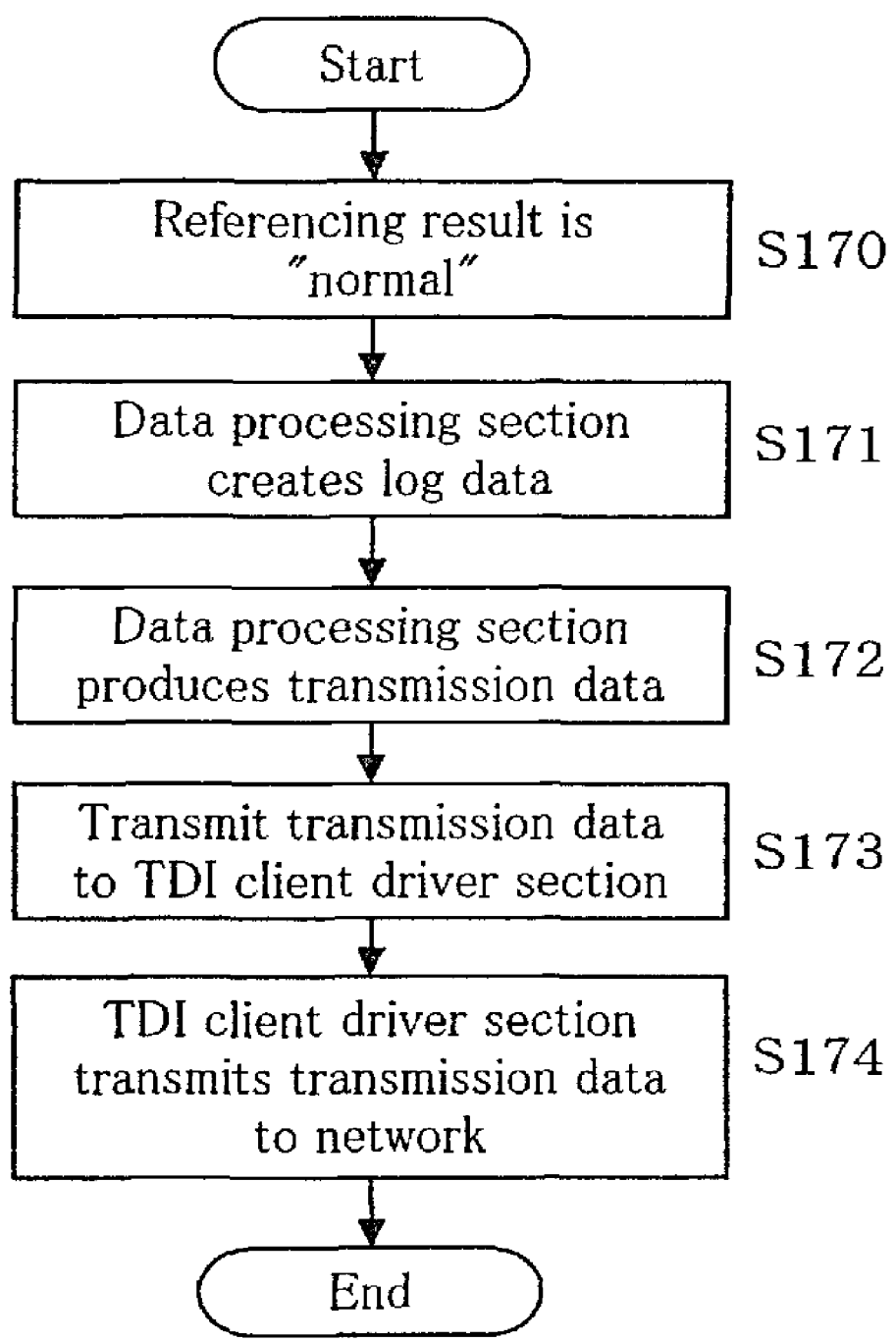
FIG. 10 is a flowchart showing the operation of the second embodiment of the present invention.

The data processing section 19 judges whether or not the referencing result is "normal" at step S114 (see the flowchart of FIG. 4). If the referencing result is judged to be "normal", the data processing section 19 transmits the access request to the file system supervising driver section 32 (S115) to create an access log and transmits it to the log server 28 on the network 26. The transmission procedure will be described below with reference to the flowchart of FIG. 10.

If the referencing result is judged to be "normal" (S170), the data processing section 19 creates an access log(S171) and produces transmission data to be transmitted to the network 26 (S172). The data processing section 19 transmits the produced transmission data to the TDI client driver section 20 (S173). The TDI client driver section 20 receives the transmission data and transmits it to the network through the network driver 21 (S174).

The log server 28 receives the transmission data, takes out the access log from the transmission data and adds it to the log database 29 stored in a storage device. Accordingly, accesses made to files stored in the hard disk 34 of the electronic computer 11 can be grasped by referencing the log database 29.

The structure of the log database 29 is basically the same as that of the access log database 38 shown in the first embodiment. Therefore, a description thereof is omitted. It should be noted, however, that the control condition database 36, the file attribute database 37 and the log database 29 are merely one example and may differ in structure, depending upon business use application and the feature of the file system or the system design feature.

Further, if the electronic computer 11 has input devices such as a keyboard and a mouse, user authentication can be performed by utilizing the peculiarity of each individual user exhibited when entering data from these input devices. Thus, it is possible to construct a system in which the user authentication is combined with the second embodiment. In this case, it is possible to prevent unauthorized access, particularly unauthorized access to files in the hard disk, and to perform control against unauthorized access.

Third Embodiment

Figure 11:
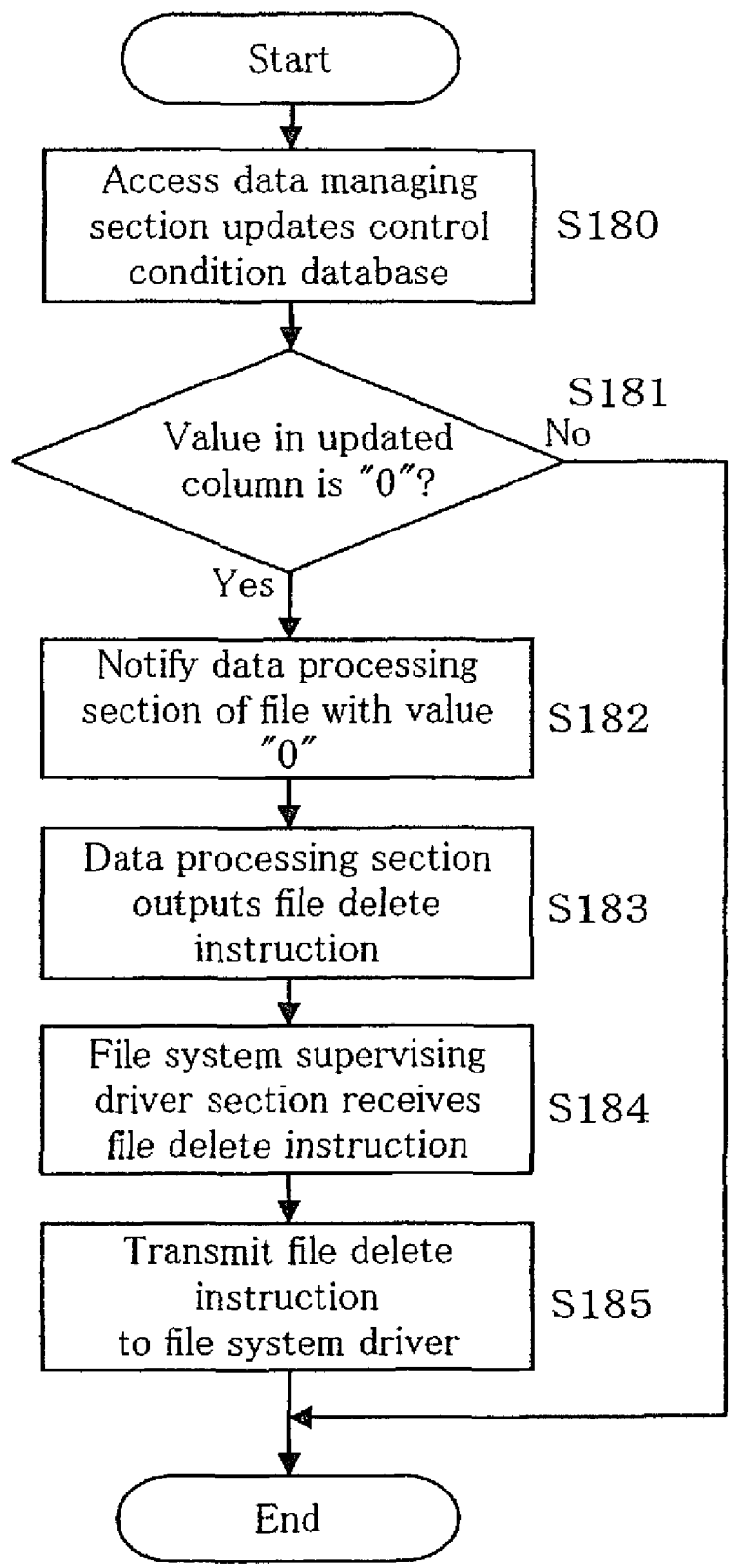
FIG. 11 is a flowchart showing the operation of the second embodiment of the present invention.
Figure 12:
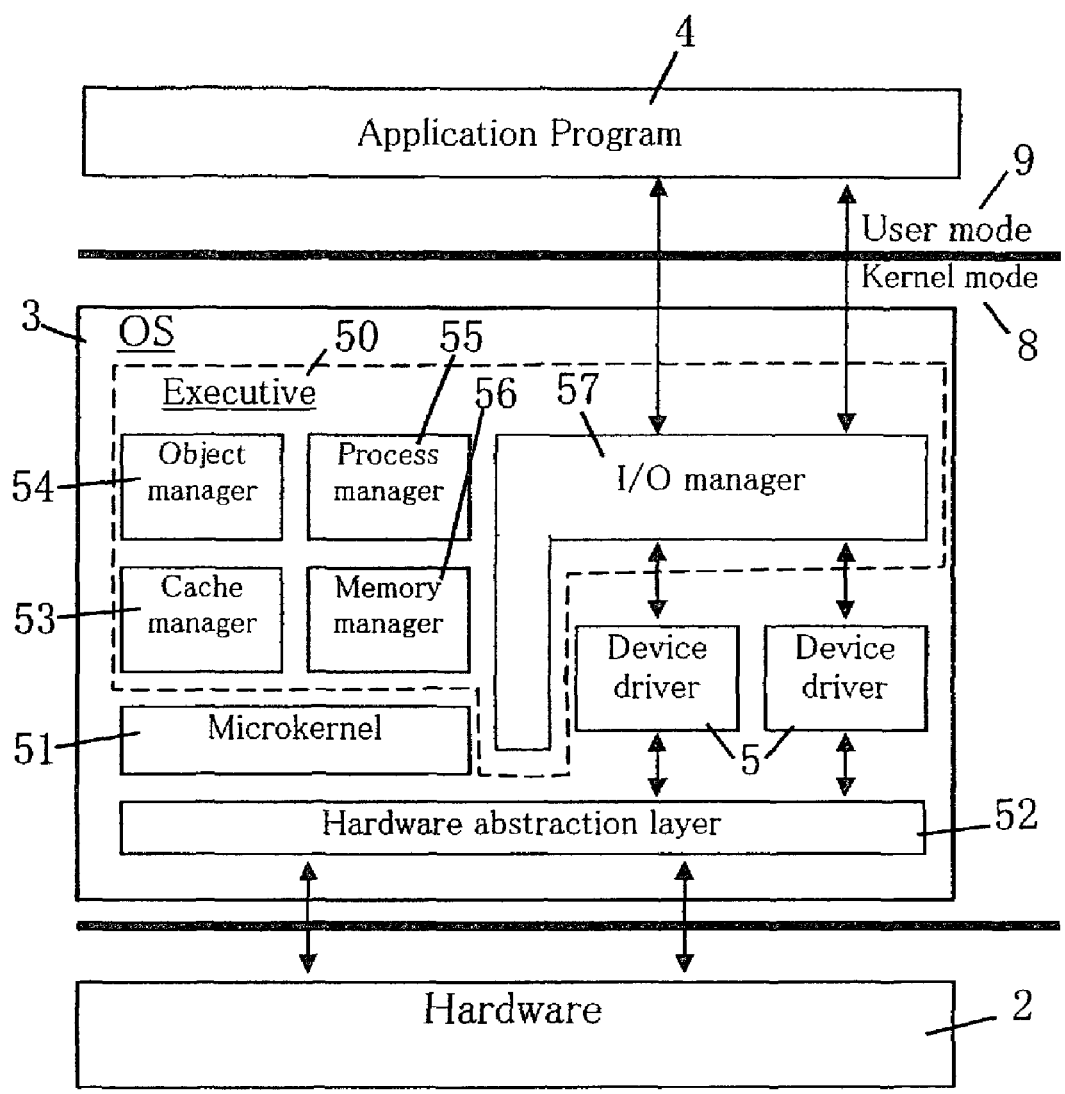
FIG. 12 is a diagram showing the architecture of Windows.
Figure 13:
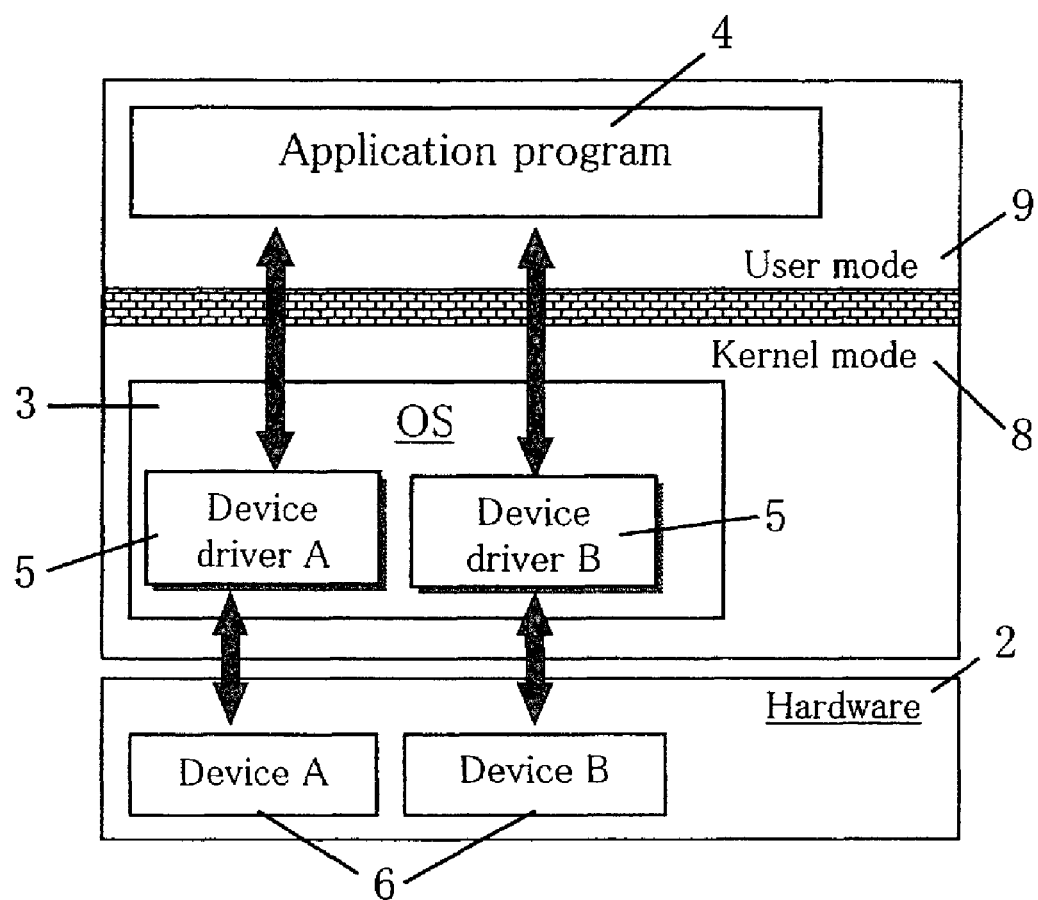
FIG. 13 is a conceptual view of a conventional OS and device drivers.
Figure 14:
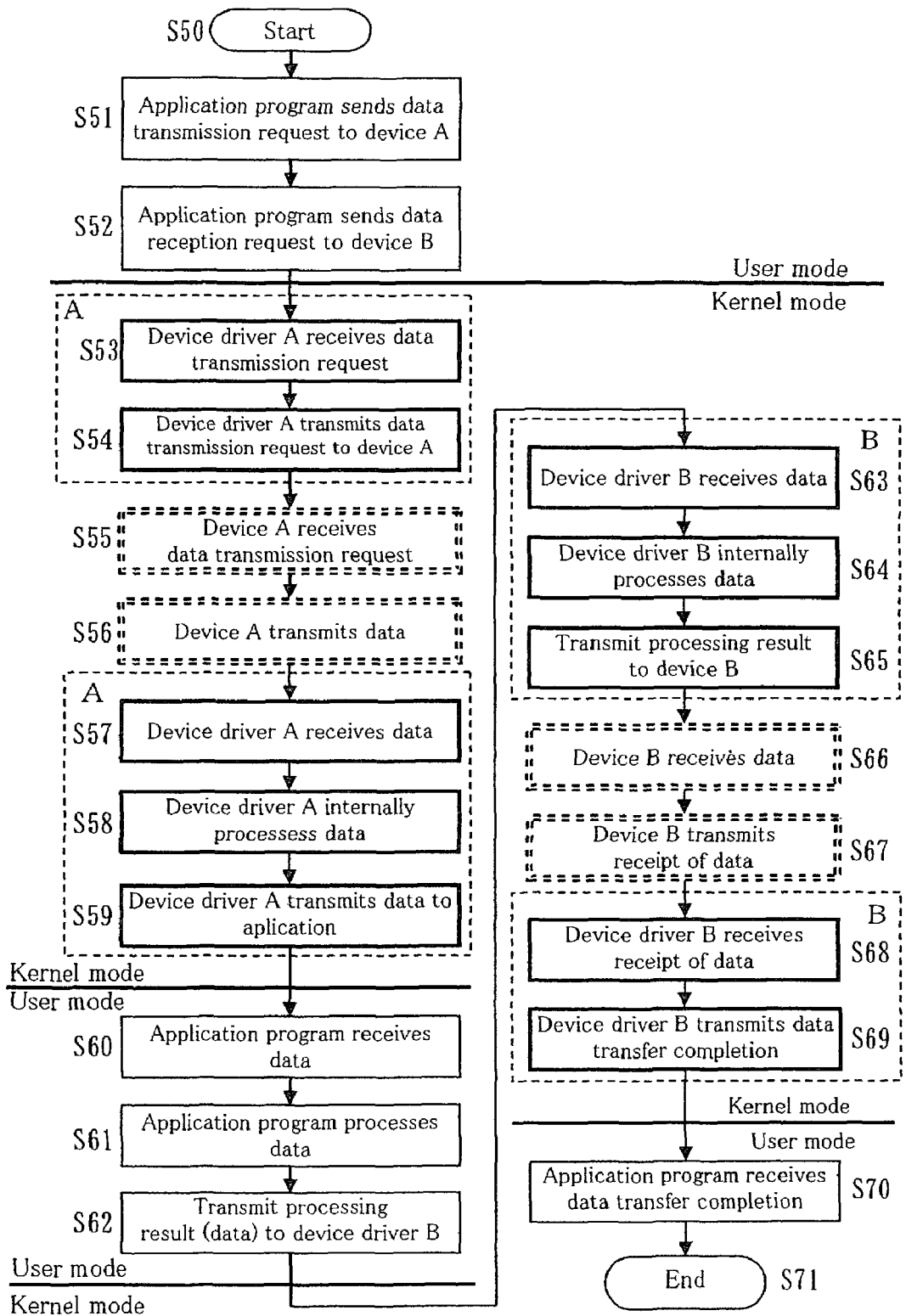
FIG. 14 is a flowchart showing the operating procedure of the conventional device drivers.
Figure 15:
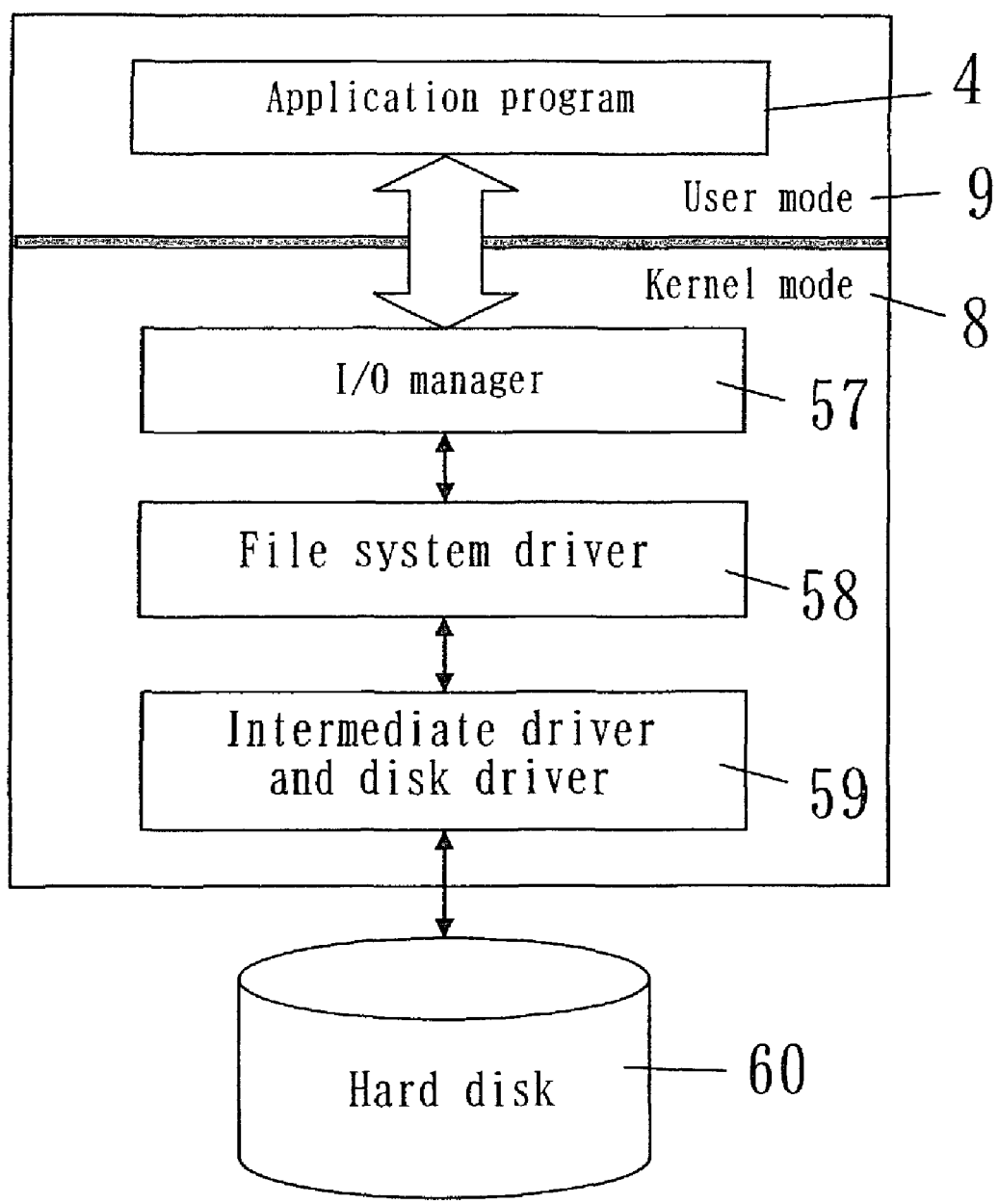
FIG. 15 shows the concept of a file system driver.

The third embodiment is similar to the above-described first or second embodiment. Therefore, a detail description thereof is omitted, and only a part of the third embodiment in which it differs from the first or second embodiment will be described below. In the third embodiment, the data processing section 19 has the function of issuing an instruction for deleting a file in the file system. A procedure for deleting a file in the hard disk 34 by using the above-described function will be described with reference to the flowchart of FIG. 11.

After a file in the file system has been accessed, the access data managing section 30 updates the control condition database 36 in response to an instruction from the data processing section 19 (S180). At this time, the access data managing section 30 confirms the value in the updated column (S181). If the value is "0", the access data managing section 30 informs the data processing section 19 of this fact (S182). Upon receipt of the notice that the value is "0", the data processing section 19 outputs a file delete instruction to delete the file for which the value is "0" (S183).

The file system supervising driver section 32 receives the file delete instruction (S184) and transmits it to the file system driver 33 (S185). Accordingly, the file system driver 33 deletes the file. Thus, it is possible to delete a file in the file system by setting the value of the file in the control condition database 36 to a specific value.

As stated above, when the value of the file in the control condition database 36 changes from "1" to "0", the data processing section 19 outputs a file delete instruction. This means that the file is deleted after being accessed only once. This technique is applicable to various situations. For example, it can be set that a file downloaded from the network disappears after it has been executed only once.

Fourth Embodiment

Figure 16:
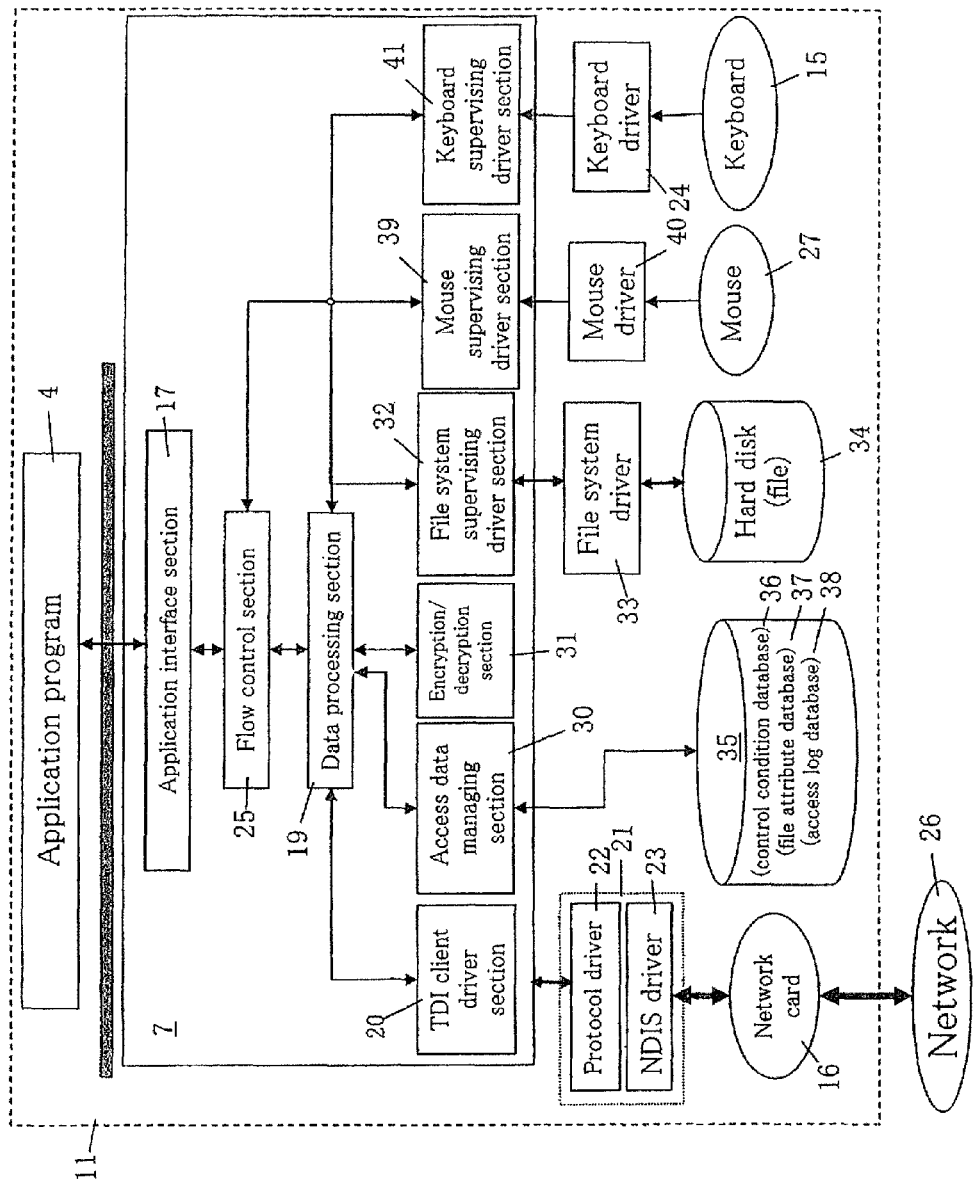
FIG. 16 is a conceptual view showing a fourth embodiment of the present invention.

FIG. 16 is a conceptual view of a fourth embodiment of the present invention. The fourth embodiment is similar to the first to third embodiments. Therefore, a detailed description thereof is omitted, and only a part of the fourth embodiment in which it differs from the first to third embodiments will be described below.

In the fourth embodiment, the common interface driver 7 has the functions of limiting input devices of the electronic computer 11, such as a mouse 27 and a keyboard 15, and limiting and controlling operations taking place in response to instructions entered from the input devices. These functions are performed by a mouse supervising driver section 39 and a keyboard supervising driver section 41 of the common interface driver 7.

When the mouse 27 is actuated, input data entered therefrom is transmitted to the mouse supervising driver section 39 by a mouse driver 40. When the keyboard 15 is actuated, input data entered therefrom is transmitted to the keyboard supervising driver section 41 by a keyboard driver 24. Further, the input data is transmitted to the data processing section 19 or the flow control section 25 from the mouse supervising driver section 39 or the keyboard supervising driver section 41.

Input data entered from the input device is sent to the data processing section 19 from the mouse supervising driver section 39 or the keyboard supervising driver section 41 and transmitted to the application interface section 17 through the flow control section 25. Then, the input data is provided to the application program 4 from the application interface section 17.

A user operating the electronic computer 11 may open, copy or print a specific file. The user can perform these operations by actuating the keyboard 15, in particular. The system administrator or a particular use application may require to disable copying or printing of a specific file. To meet the requirements, it is necessary to limit data entry from the keyboard 15 or other input devices.

Figure 17:
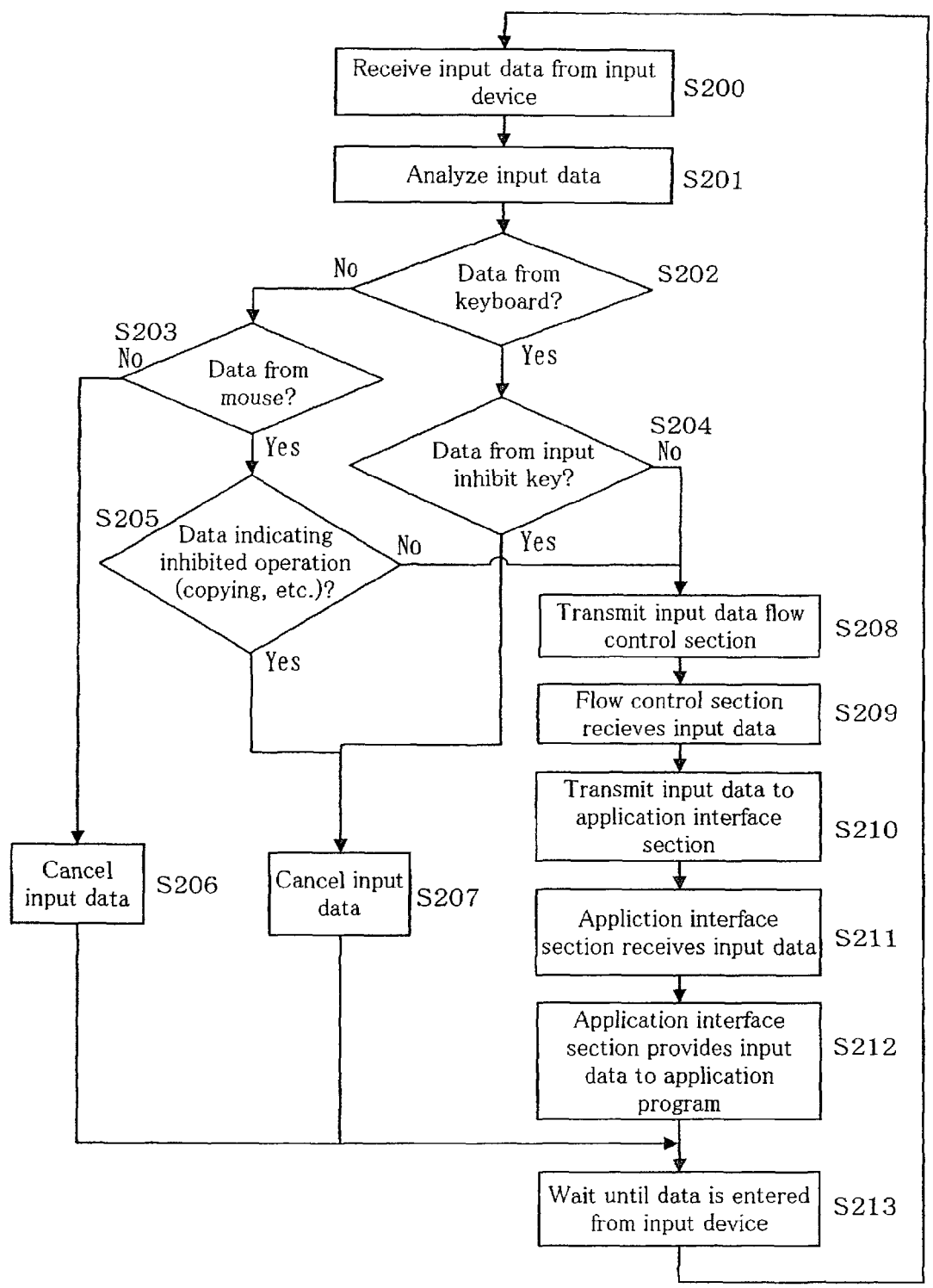
FIG. 17 is a flowchart showing the operation of the fourth embodiment of the present invention.

The operation of the fourth embodiment is shown in the flowchart of FIG. 17. The flowchart will be described below.

The data processing section 19 receives input data from an input device (S200), and analyzes the input data (S201). Then, it is judged whether or not the input data is data from the keyboard 15 (S202). If it is data from the keyboard 15, it is judged whether or not the input data is data from an input inhibit key (S204). If it is data from an input inhibit key, the input data is canceled (S207).

If the input data is not data from an input inhibit key, the input data is transmitted to the flow control section 25 (S208). The flow control section 25 receives the input data (S209) and transmits it to the application interface section 17 (S210). The application interface section 17 receives the input data (S211) and transmits it to the application program 4 (S212). Then, the data processing section 19 waits until subsequent input data is entered from an input device (S213). When there is subsequent input data, the processing is repeated from step S200.

If it is judged at step S202 that the input data is not data from the keyboard 15 ("No" is the answer), it is judged whether or not the input data is data from the mouse 27 (S203). If it is data from the mouse 27, it is checked whether or not the input data is data indicating an inhibited operation from the mouse 27 (S205). If the input data is data indicating an inhibited operation from the mouse 27, the process proceeds to step S207 (see the above description of S207).

If it is judged that the input data is not data indicating an inhibited operation from the mouse 27 (S205), the process proceeds to step S208. If it is judged at step S203 that the input data is not data from the mouse 27, the input data is canceled (S206). If the input data is canceled at step S206 or S207, the data processing section 19 waits until subsequent data is entered (S213).

When receiving input data from an input device, the data processing section 19 judges from which of input devices the input data has been entered (S202 and S203). Then, the data processing section 19 extracts control conditions corresponding to the input device from which the input data has been entered, although not shown in the figure. Alternatively, the control conditions corresponding to the input device may have previously been set in the data processing section 19 or the flow control section 25.

Alternatively, when there is access to a specific file from the application program 4, control conditions corresponding to an input device may be set in the database 35 in association with control conditions for the specific file. In this case, if there are control conditions corresponding to an input device when the data processing section 19 references the database 35, the system enters into an operating mode for checking input data from an input device.

By doing so, it can be set that when a user opens a certain file, he or she can only read the file but cannot perform other operations such as copying, printing or editing of the file.

Fifth Embodiment

Figure 18:
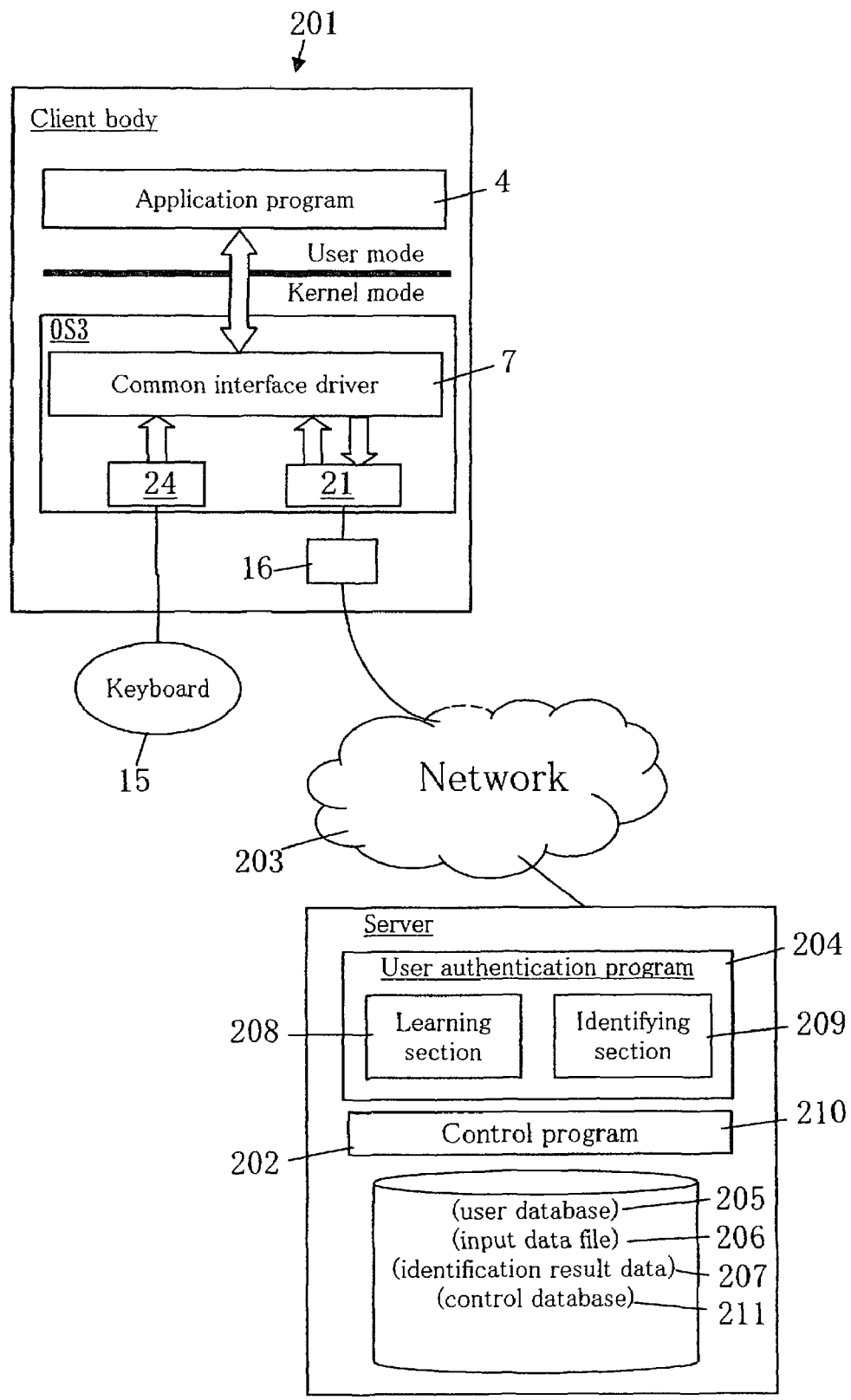
FIG. 18 is a diagram showing schematically a fifth embodiment of the present invention.

FIG. 18 shows the outline of the fifth embodiment. The system in the fifth embodiment comprises at least a client 201 and a server 202. The client 201 and the server 202 are connected to each other through a network 203 to perform transmission and reception of data. The network 203 may be any wired or wireless network, e.g. LAN or Internet, which allows the client 201 and the server 202 to perform transmission and reception of data.

The client 201 is an electronic computer having at least a keyboard 15 and a LAN board 16. The client 201 has a common interface driver 7 installed therein. The client 201 further has a database 35 (see FIG. 3). The common interface driver 7 has functions similar to those of the common interface driver 7 in the first to fourth embodiments. Therefore, the common interface driver 7 will not be herein described in detail. The common interface driver 7 has the function of obtaining data that the user enters from the keyboard 15 and transmitting the data to the server 202. More specifically, the common interface driver 7 obtains input data including data for identification of a key that the user has depressed or released and time data concerning the depression or release of the key, and transmits the input data to the server 202.

The server 202 has a user authentication program 204 installed therein. The server 202 has a user database 205 comprising data indicating data entry characteristics of users exhibited when they enter data from the keyboard 15. The user authentication program 204 receives input data transmitted from the client 201 and analyzes the input data while comparing it with the data in the user database 205 to identify the user.

Further, the server 202 has a control database 211. The control database 211 contains data indicating an accessible range within which a user can make access. For example, the control database 211 may contain control conditions similar to those stored in the control condition database shown in FIG. 7.

The user authentication program 204 identifies the user. A control program 210 references the control database 210 by using the result of the user identification to obtain accessible range data concerning the user and transmits the obtained data to the client 201. The client 201 receives the accessible range data and stores it into the control condition database 36. Thus, it is possible to control access to the file system and entry of data from an input device. The operation performed at the client has been described in derail in the foregoing first to fourth embodiments. Therefore, a detailed description thereof is omitted. In the following, the operation at the server 202 will mainly be described.

[Outline of LVQ]

The user authentication program 204 analyzes the input data by using a neural network technique. For example, the user authentication program 204 uses a learning vector quantization algorithm (hereinafter abbreviated as "LVQ"). The LVQ is a technique developed by T. Kohonen. There are a plurality of versions LVQ1 to LVQ3.

In the fifth embodiment, LVQ1 is used. Other LVQ algorithms and neural network algorithms are also usable. LVQ is a publicly known technique detailed, for example, in T. Kohonen "Self-Organizing Maps" (Springer Series in Information Sciences, 30, 2000; Springer Verlag). Therefore, a detailed description of LVQ is omitted herein.

The LVQ method is as follows. Sample data (hereinafter referred to as "teacher data") given in the initial state is divided into classes characterized by a plurality of feature vectors to effect quantization, and the distance between an input vector and each feature vector is calculated. A feature vector at the closest distance to the input vector is determined, and the class to which the closest feature vector belongs is judged to be a class to which the input vector belongs.

The LVQ1 is expressed by the following equation, and learning is performed as follows. A plurality of feature vectors that characterize classes have been given in the initial state. Distances between input teacher data and all the feature vectors are calculated. Thus, the class to which the feature vector at the closest distance to the teacher data belongs can be estimated as the class to which the teacher data belongs.

A specified number of feature vectors are produced for each class and initialized by using a random number to start learning. The value of the random number is between the maximum and minimum values of vector data in each class. The feature vectors are updated to perform learning according to the following equation 1. The learning is performed a predetermined number of times to obtain an optimal feature vector with respect to the teacher data.

In the equation 1, $m_i$ and $m_j$ denote a feature vector at the closest distance to teacher data x. $m_i$ is the feature vector when it belongs to a class different from that of the teacher data x, and $m_j$ is the feature vector when it belongs to the same class as that of the teacher data x. $\sigma(t)$ is a coefficient that assumes a value of from 0 to 1.

$$m_i(t+1) = m_i(t) - \sigma(t)[x(t) - m_i(t)]$$

$$m_j(t+1) = m_j(t) + \sigma(t)[x(t) - m_j(t)]$$

$$m_k(t+1) = m_k(t) \text{ for } k \cdot i, j \quad \text{(Eq. 1)}$$

[Personal Characteristics]

In the fifth embodiment, data entry characteristics of a user are expressed by using a time at which the user depresses a specific key and a time at which he or she releases the key. That is, the depress time at which the user depresses a key and the release time at which he or she releases the depressed key are used. Data entry characteristics of a user can be determined by the interrelation between a key that the user types and keys typed before and after the key.

Figure 19A:
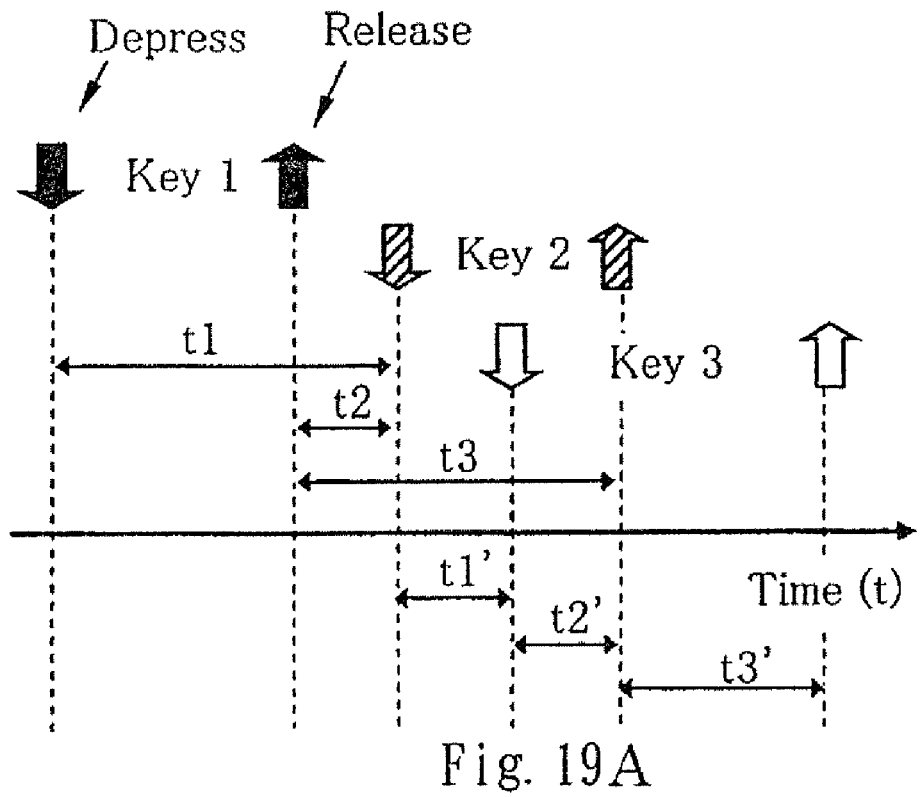
FIG. 19 is a diagram showing time intervals for key read operation in the fifth embodiment.
Figure 19B:
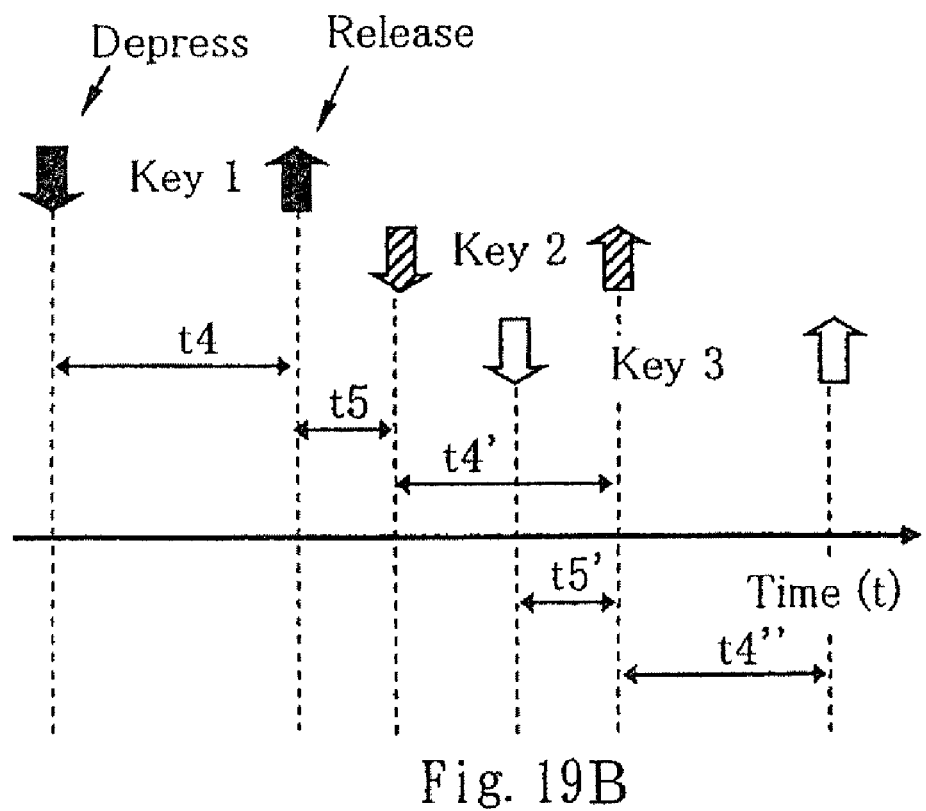

FIG. 19 illustrates an example of the user's data entry characteristics determined by the interrelation between keys typed by the user. Kinds of time as stated below are used as data showing data entry characteristics of a user. The abscissa axis in the figure is a time base. The downward large arrows each show the time of the operation of depressing a key. Similarly, the upward large arrows each show the time of the operation of releasing a depressed key. Each combination of downward and upward large arrows shows a typing operation in which the user depresses and releases one key. When the user enters data from the keyboard 15, the common interface driver 7 obtains a key code for identifying each key typed by the user, the time of depressing the key and the time of releasing the key, and transmits these pieces of data to the server 202 as input data.

Graph (a) in FIG. 19 shows an example in which the user types keys 1 to 3 successively. In the graph, t1, t2 and t3 show the temporal interrelation between the key 1 and the key 2. That is, t1 is a time interval from the time of depressing the key 1 to the time of depressing the key 2, and t2 is a time interval from the time of releasing the key 1 to the time of depressing the key 2. Further, t3 is a time interval from the time of releasing the key 1 to the time of releasing the key 2.

In the graph, t1', t2' and t3' show the temporal interrelation between the key 2 and the key 3 in the same way as in the case of t1, t2 and t3. The time intervals t2 and t2' can assume minus values according to the interrelation between the time of releasing the key 1 and the time of depressing the key 2 or the interrelation between the time of releasing the key 2 and the time of depressing the key 3.

Graph (b) in FIG. 19 shows another example in which the user types the keys 1 to 3 successively. In the graph, t4, t5, t4', t5' and t4" show the temporal interrelation among the keys 1 to 3. That is, t4 is a time interval from the time of depressing the key 1 to the time of releasing the key 1, and t5 is a time interval from the time of releasing the key 1 to the time of depressing the key 2. Further, t4' is a time interval from the time of depressing the key 2 to the time of releasing the key 2, and t5' is a time interval from the time of releasing the key 2 to the time of depressing the key 3. Furthermore, t4" is a time interval from the time of depressing the key 3 to the time of releasing the key 3.

The time intervals t5 and t5' can assume minus values according to the interrelation between the time of releasing the key 1 and the time of depressing the key 2 or the interrelation between the time of releasing the key 2 and the time of depressing the key 3.

[Processing at Client]

In the sixth embodiment, the client 201 obtains input data at the time of the user's entering data from the keyboard 15 and transmits the input data to the server 202. At the client 201, data concerning keys is obtained by the common interface driver 7 running in the kernel mode. The operation of the common interface driver 7 has already been described in detail in connection with the foregoing first to fifth embodiments. Therefore, a description thereof is omitted herein.

FIG. 19 illustrates an example of input data obtained by the common interface driver 7 and transmitted to the server 202. The input data comprises the following columns: "Number" 210; "Time" 211; "IP" 212, "Key Code" 213; and "Depress/Release" 214. "Number" 210 is the ordinal number of key data obtained. "Time" 211 is the time at which key data is obtained. "Time" 211 is expressed in units of 100 nanoseconds of real time.

"IP" 212 is an address on the network for identifying the client 201. "Key Code" 213 is the code number of each key. "Key Code" 213 may be a key code specified by a country or an international organization. Alternatively, "Key Code" 213 may be a physical code number of a keyboard. "Depress/Release" 214 indicates whether a key has been depressed or released. In this column, "1" corresponds to depression, and "0" corresponds to release.

The common interface driver 7 obtains key data through the data take-in section 18 and produces input data by adding time data to the key data in the data processing section 19 (see FIG. 3). The input data thus produced is transmitted to the server 202 by the TDI client driver section 20 through the LAN board driver 21.

[Processing at Server]

The server 202 receives the input data transmitted from the client 201 and stores it as an input data file 206 in a storage medium, e.g. a hard disk or a memory. At the server 202, data entered by specific users have been obtained in advance to produce a user database 205. The user authentication program 204 compares the data in the input data file 206 with the data in the user database 205 to identify the user.

The user authentication program 204 comprises a learning section 208 and an identifying section 209. The learning section 208 is a program for producing feature vectors from the user database 205. The identifying section 209 is a program for identifying the user by comparing the input data with the feature vectors. The function of each section will be shown below in detail.

[Learning Section 208]

In the learning section 208, teacher data is read to obtain feature vectors. Feature data is produced from the read teacher data by obtaining data concerning a key typed by the user, data concerning the time of depressing and releasing the key, and time data related to keys typed before and after the key, as illustrated in FIG. 19 by way of example. The time intervals t1 to t3 or t4 and t5 illustrated in FIG. 19 are one example of the feature data. Pieces of feature data corresponding to all the read teacher data are obtained, and feature vectors showing the characteristic features of all the pieces of feature data are obtained.

Figure 21:
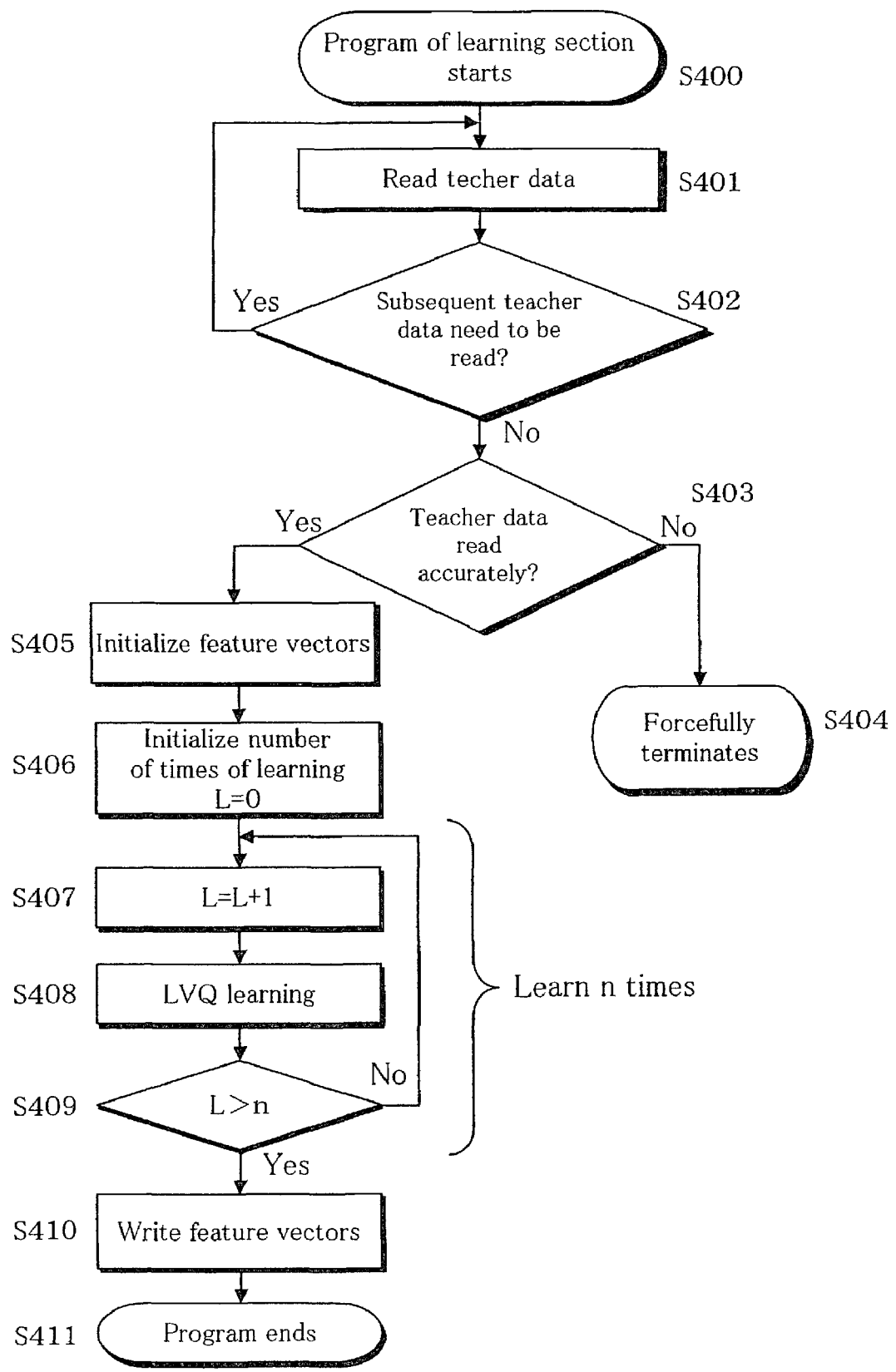
FIG. 21 is a flowchart showing an example of a program of a learning section in the fifth embodiment.

The flowchart of FIG. 21 shows the operating procedure of the learning section 208. When the user authentication program 204 in the server 202 is started, the program of the learning section 208 is executed (S400). Teacher data is read from the user database 205 stored in the server 202 (S401). The user database 205 is stored as a file in a text or binary form, for example. Subsequent teacher data is read until a specified number of pieces of teacher data have been read (S402 S401).

It is judged whether or not the teacher data has been read accurately (S403). If the teacher data has not accurately been read, the program of the learning section 208 is forcefully terminated (S404). If the teacher data has been read accurately, the feature vectors are initialized (S405). In the initialization of the feature vectors, a specified number of feature vectors are produced and initialized by using random numbers. The random numbers assume a value between the maximum and minimum values of the vectors in each class.

Then, learning is started. The number of times of learning is initialized (L=0) (S406), and LVQ learning is performed a predetermined number n of times (S407 to S409). In the LVQ learning, feature vectors are updated as expressed by Eq. 1. The learning is performed with σ fixed at 0.1.

After the learning has been performed a predetermined number n of times, the feature vectors updated as the result of learning are written in memory (S410), and the program of the learning section 208 ends (S411). The feature vectors are outputted in a text or binary form and stored in the storage device of the server 202.

[Identifying Section 209]

Figure 22:
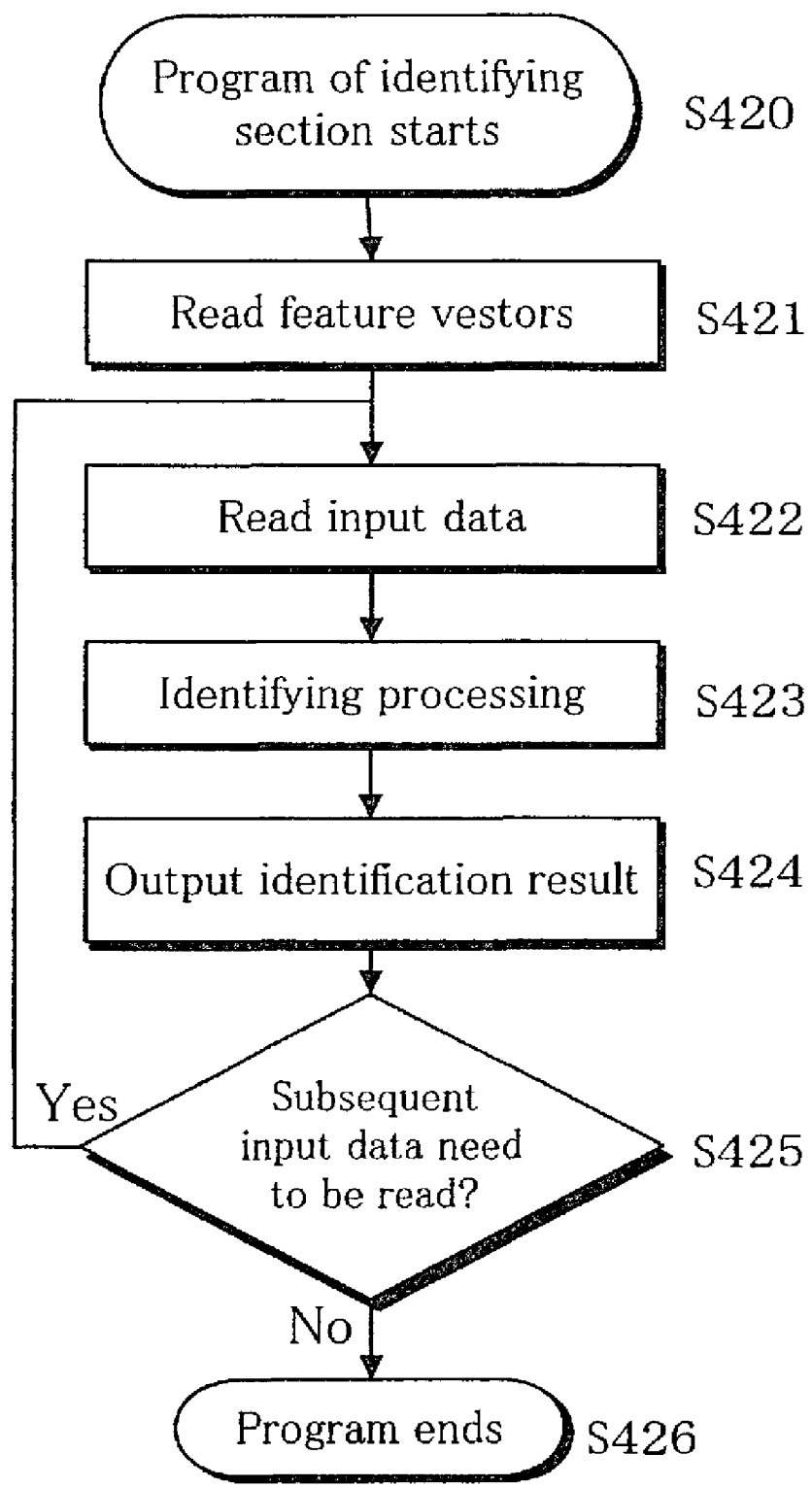
FIG. 22 is a flowchart showing an example of a program of an identifying section in the fifth embodiment.

Upon completion of the program of the learning section 208 executed to output feature vectors, the program of the identifying section 209 is executed. The flowchart of FIG. 22 shows the procedure of the program of the identifying section 209. When the program of the identifying section 209 is started (S420), the feature vectors outputted by the learning section 208 are read (S421). Then, input data concerning the user to be authenticated is read (S422).

The input data has already been transmitted from the client 201 and stored in the server 202 as the input data file 206. Upon completion of reading the input data, identifying processing is performed (S423). Upon completion of the identifying processing, the identification result is outputted (S424), and subsequent input data is read to perform identification (S425→S422). If there is no subsequent input data or a terminating instruction is received, the program is terminated (S426).

[Identification Result]

The identification result outputted by the program of the identifying section 209 is stored as a file in a text or binary form in the storage device of the server 202. FIG. 23 shows an example of identification results, which are shown in a table consisting of the row of "Read Files" 220 and the column of "Identification Results" 221. The row of "Read Files" 220 consists of rows "A", "B", . . . , "G", and the column of "Identification Results" 221 consists of columns "A", "B", . . . , "G".

Each row of "Read Files" 220 shows input data, and each column of "Identification Results" 221 shows each feature vector of teacher data. The cell at the intersection between each row and each column shows the proportion (percent) in which input data belongs to the corresponding feature vector. The program of the identifying section 209 reads "Read File A" 222, which is input data, and determines to which feature vector this input data belongs, and then outputs the result in percent.

From this table, it is possible to judge who is entering data from the keyboard of the client 201. Regarding the user of "Read File A" 222, the possibility that he or she may be a user having "Feature Vector A" 224 is "75%". The possibility that the user of "Read File A" 222 may be a user having "Feature Vector B" 225 is "6%". Regarding the user of "Read File B" 223, the possibility that he or she may be a user having "Feature Vector A" 224 is "0%". The possibility that the user of "Read File B" 223 may be a user having "Feature Vector B" 225 is "100%".

As will be understood from the above, the results of the identification vary according to each individual user's data entry characteristics. For a particular user, the identification result may be "100%". However, if the data entry characteristics of one user are similar to those of another, the identification result may be of the order of "70%" to "80%".

[Control Program]

The server 202 has a control program 210. The control program 210 is for obtaining access right, an accessible range, etc. of a user using the client 201 from the control database 211 by using the result of the user authentication performed by the user authentication program 204 and for transmitting the obtained data to the client 201.

The control program 210 receives the identification result outputted from the identifying section 209 and obtains data concerning the user corresponding to the identification result from the control database 211. The control program 210 transmits the data obtained from the control database 211 to the client 201.

FIG. 24 shows an example of the control database 211. The control database 211 is additionally provided with the column entitled "Client" 122 in comparison to the control condition database 36 shown in FIG. 7. The other columns 101 and 113 to 120 entitled in the same way as in the control condition database 36 are concerned with the control of access to files, which has been described above in connection with the first embodiment. "Client" 122 indicates the client 201 that a user is using, which is expressed by an identification address on the network.

In the column of "Client" 122 of the control database 211, the identification address of the client 201 has previously been stored. In the column of "User" 118, names of authorized users who can use the client 201 have previously been stored.

Upon receipt of the identification result from the identifying section 209, the control program 210 references the control database 211 to check whether or not the user corresponding to the identification result is an authorized one, and transmits result data to the client 201. The result data includes data such as the name of the user, the user's accessible range, and the right to access a file. If the user using the client 201 is not an authorized one, the control program 210 transmits the result data including an instruction for stopping the operation of the user using the client 201 to the client 201.

The client 201 receives the data from the server 202 and updates the control condition database 36. Accordingly, the user using the client 201 can be identified at all times, and it is possible to perform control according to the way in which the user is using the client 201. If the user is trying to make unauthorized access, the access can be stopped. The control program 210 and the user authentication program 204 may constitute the same program in which the programs 210 and 204 run in association with each other.

If it is found that the user is trying to make an unauthorized access or if the user cannot be authenticated as the result of the personal authentication performed at the server 202, the system of the client 201 can be locked by an instruction from the server 202. The system can be unlocked by an instruction from the server 202 or by access from the system administrator of the client 201. Preferably, when the power to the client 201 is turned on after it has been turned off with the system of the client 201 placed in the locked state, the system is reset with the operating environment thereof maintained in the condition immediately before the turning off of the power. In this case, various parameters concerning the operating environment are stored in a storage device of the client 201, e.g. a hard disk or a memory.

FIELD OF INDUSTRIAL APPLICATION

In the present invention, the access to the file system from an input device is controlled in the kernel mode, and an accessible range and access right are set for each user. In addition, authentication of a user using the electronic computer is performed, and the access to the file system is controlled in the kernel mode on the basis of the user's accessible range and access right. When there is unauthorized access, an unregistered user's access, etc, the system can be locked. Authentication of a user is performed when the user accesses the electronic computer for the first time, or sequentially when the user uses the electronic computer. Accordingly, it is possible to ensure security even more if the present invention is used by being incorporated in management systems in fields related to security protection, e.g. management systems handling personal data, national classified information, corporate secret data, etc.

What is claimed is:

1. A computer readable medium having an access control program recorded thereon for controlling a file system driver of an electronic computer connected with a plurality of devices, including a storage device, and is operated by an operating system for operating said electronic computer, wherein when access is made from an input device of said electronic computer or an application program to a specific file in a file system of said electronic computer, said access control program allows said electronic computer to function as a means for controlling an access instruction requesting said access, said operating system has a file system driver for controlling said file system, said access control program is located between a device driver layer consisting of device drivers for controlling said plurality of devices respectively and fundamental programs provided in a kernel mode by said operating system, said access control program operates in the kernel mode that is an operating mode can execute all commands provided by said operating system, and said access control program works as to function said electronic computer as a common interface means with functions (I) for being a common window of said device drivers and for performing communication together between a device driver and said application program through executives, (II) for sending and receiving data between said plurality of device drivers or between said application program and said device driver when request is made by said application program, (III) when access is made from said application program to said specific file stored in said storage device of said electronic computer, for receiving an access request from said application program to said specific file through a standard interface of said Operating System, and for providing data communication between said application program and said storage device, said common interface means comprising:

interface means for receiving said access instruction;

flow control means for analyzing said access instruction and for controlling a flow of data;

referencing means for referencing an access control database comprising a column of filenames in said file system and a column of at least one access method and for outputting a referencing result;

data processing means (1) for receiving a file name of said specific file and said access instruction from said flow control means, (2) for passing information concerning said file name of said specific file and said access instruction to said referencing means and (3) for receiving said referencing result relative to said access instruction, (4) for performing judgment whether said referencing result is normal, (5) for cancelling said access instruction when the result of said judgment is abnormal, (6) for passing said access instruction to the next file system supervising driver means when the result of said judgment is normal;

said file system supervising driver means (a) for receiving said access instruction from said data processing means, (b) for passing said access instruction to said file system driver, (c) for receiving a result of execution of said access instruction from said file system driver and (d) for passing said result of execution to said flow control means;

said flow control means passes said result of execution to said interface means, said interface means passes said result of execution to said input device or said application program.

2. The computer readable medium according to claim 1, wherein said referencing means makes a change corresponding to said access instruction to said access control database.

3. The computer readable medium according to claim 1, wherein if a value in said column of access method for said specific file is a predetermined value, said judgment made by said data processing means produces said "abnormal" result.

4. The computer readable medium according to claim 3, wherein said column of access method comprises at least one of columns of creating a file, opening a file, closing a file, reading a file, writing a file, file accessible period, and file accessible time zone, and a value in said column comprises at least one selected from an integer, a symbol, and a word.

5. The computer readable medium according to claim 4, wherein said referencing means confirms said value in said column of said access method, and when said value is "0", said reference means informs to said data processing means;
said data processing means receives informed data and, outputs a file deleting instruction to said file system supervising means to delete said specific file of which said value is "0"; and
said file system supervising means transmits said file deleting instruction to said file system driver and said specific file of which said value is "0" is deleted.

6. The computer readable medium according to claim 1, further comprising: input means for receiving input data entered from said input device;
wherein said data processing means has a function to stop all or a part of functions of said input device, and said data processing means receives and analyzes said input data from said input means, and provides specific data in said input data to said interface means.

7. The computer readable medium according to claim 6, wherein said input means is a keyboard, and stopping of said function is stopping of input data entered from a specific key of said keyboard.

8. The computer readable medium according to claim 6, wherein said input means is a mouse, and stopping of said function is stopping of specific data entered from said mouse.

9. The computer readable medium according to claim 1, wherein storage device of said electronic computer contains a personal authentication program for performing personal authentication of a user using said electronic computer, said personal authentication program comprising: means for obtaining key entry data comprising signals entered from keys of a keyboard serving as said input device; first authentication means for performing said personal authentication using data entry characteristics exhibited when entering said key entry data to identify said user; means for obtaining conditions indicating an accessible range within which said user can make access by referencing said access control database; and control means for transmitting said conditions to said flow control means to control said access made by said user.

10. The computer readable medium according to claim 9, wherein storage device of a server connected to said electronic computer through a network contains a control program and a control database comprising users' personal information and control conditions, and said electronic computer has transmission means for transmitting said key entry data to said server, said control program having: reception means for obtaining transmission data transmitted by said transmission means; second authentication means for performing said personal authentication using data entry characteristics exhibited when entering said key entry data, which is included in said transmission data, to identify said user; database referencing means for obtaining conditions indicating an accessible range within which said user can make access by referencing said control database; and control condition transmitting means for transmitting said conditions and a control instruction to said electronic computer to control said user's access.

11. A storage medium recording an access control program for controlling a file system driver of an electronic computer connected with a plurality of devices, including a storage device, and is operated by an operating system for operating said electronic computer,
wherein when access is made from an input device of said electronic computer or an application program to a specific file in a file system of said electronic computer, said access control program allows said electronic computer to function as a means for controlling an access instruction requesting said access,
said operating system has a file system driver for controlling said file system,
said access control program operates in a kernel mode that is an operating mode can execute all commands provided by said operating system, and is located between a device driver layer consisting of device drivers for controlling said plurality of devices respectively and fundamental programs provided in a kernel mode by said operating system, and
said access control program works as to function said electronic computer as a common interface means with functions (I) for being a common window of said device drivers and for performing communication together between a device driver and said application program through executives, (II) for sending and receiving data between said plurality of device drivers or between said application program and said device driver when request is made by said application program, (III) when access is made from said application program to said specific file stored in said storage device of said electronic computer, for receiving an access request from said application program to said specific file through a standard interface of said Operating System, and for providing data communication between said application program and said storage device,
said common interface means comprising:
interface means for receiving said access instruction;
flow control means for analyzing said access instruction and for controlling a flow of data;
referencing means for referencing an access control database comprising a column of filenames in said file system and a column of at least one access method and for outputting a referencing result;
data processing means (1) for receiving a file name of said specific file and said access instruction from said flow control means, (2) for passing information concerning said file name of said specific file and said access instruction to said referencing means and (3) for receiving said referencing result relative to said access instruction, (4) for performing judgment whether said referencing result is normal, (5) for cancelling said access instruction when the result of said judgment is abnormal, (6) for passing said access instruction to the next file system supervising driver means when the result of said judgment is normal;
said file system supervising driver means (a) for receiving said access instruction from said data processing means, (b) for passing said access instruction to said file system driver, (c) for receiving a result of execution of said access instruction from said file system driver and (d) for passing said result of execution to said flow control means;
said flow control means passes said result of execution to said interface means, said interface means passes said result of execution to said input device or said application program.

12. The storage medium according to claim 11, wherein said referencing means writes a change corresponding to said access instruction to said access control database.

13. The storage medium according to claim 11, wherein if a value in said column of access method for said specific file is a predetermined value, said judgment made by said data processing means produces said "abnormal" result.

14. The storage medium according to claim 13, wherein said column of access method comprises at least one of columns of creating a file, opening a file, closing a file, reading a file, writing a file, file accessible period, and file accessible time zone, and a value in said column comprises at least one selected from an integer, a symbol, and a word.

15. The storage medium according to claim 14, wherein said referencing means confirms said value in said column of said access method, and when said value is "0", said reference means informs to said data processing means;

said data processing means receives informed data and, outputs a file deleting instruction to said file system supervising means to delete said specific file of which said value is "0"; and said file system supervising means transmits said file deleting instruction to said file system driver and said specific file of which said value is "0" is deleted.

16. The storage medium according to claim 11, further comprising: input means for receiving input data entered from said input device;

wherein said data processing means has a function to stop all or a part of functions of said input device, and said data processing means receives and analyzes said input data from said input means, and provides specific data in said input data to said interface means.

17. The storage medium according to claim 16, wherein said input means is a keyboard, and stopping of said function is stopping of input data entered from a specific key of said keyboard.

18. The storage medium according to claim 16, wherein said input means is a mouse, and stopping of said function is stopping of specific data entered from said mouse.

19. The storage medium according to claim 11, wherein storage device of said electronic computer contains a personal authentication program for performing personal authentication of a user using said electronic computer, said personal authentication program comprising: means for obtaining key entry data comprising signals entered from keys of a keyboard serving as said input device; first authentication means for performing said personal authentication using data entry characteristics exhibited when entering said key entry data to identify said user; means for obtaining conditions indicating an accessible range within which said user can make access by referencing said access control database; and control means for transmitting said conditions to said flow control means to control said access made by said user.

20. The storage medium according to claim 19, wherein storage device of a server connected to said electronic computer through a network contains a control program and a control database comprising users' personal information and control conditions, and said electronic computer has transmission means for transmitting said key entry data to said server, said control program having: reception means for obtaining transmission data transmitted by said transmission means; second authentication means for performing said personal authentication using data entry characteristics exhibited when entering said key entry data, which is included in said transmission data, to identify said user; database referencing means for obtaining conditions indicating an accessible range within which said user can make access by referencing said control database; and control condition transmitting means for transmitting said conditions and a control instruction to said electronic computer to control said user's access.

* * * * *